(12) United States Patent
McHugh et al.

(10) Patent No.: US 9,322,081 B2
(45) Date of Patent: Apr. 26, 2016

(54) RETRIEVAL OF HIGH VALUE REFRACTORY METALS FROM ALLOYS AND MIXTURES

(75) Inventors: Lawrence F. McHugh, North Andover, MA (US); Leonid N. Shekhter, Ashland, MA (US); Yuri V. Blagoveshchenskiy, Moscow (RU)

(73) Assignee: Orchard Material Technology, LLC, North Andover, MA (US)

( * ) Notice: Subject to any disclaimer, the term of this patent is extended or adjusted under 35 U.S.C. 154(b) by 670 days.

(21) Appl. No.: 13/540,879

(22) Filed: Jul. 3, 2012

(65) Prior Publication Data

US 2013/0155581 A1    Jun. 20, 2013

Related U.S. Application Data

(60) Provisional application No. 61/504,578, filed on Jul. 5, 2011.

(51) Int. Cl.

| | |
|---|---|
| *C22B 34/00* | (2006.01) |
| *C22B 34/24* | (2006.01) |
| *C22B 34/34* | (2006.01) |
| *C22B 34/36* | (2006.01) |
| *C22B 61/00* | (2006.01) |
| *H01G 9/042* | (2006.01) |
| *B22F 9/28* | (2006.01) |
| *C22C 1/04* | (2006.01) |
| *C22C 1/08* | (2006.01) |

(52) U.S. Cl.
CPC . *C22B 34/24* (2013.01); *B22F 9/28* (2013.01); *C22B 34/34* (2013.01); *C22B 34/36* (2013.01); *C22B 61/00* (2013.01); *C22C 1/045* (2013.01); *C22C 1/08* (2013.01); *H01G 9/042* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 2,766,112 | A | 10/1956 | Schafer |
| 2,885,281 | A * | 5/1959 | Newnham ................... 75/620 |
| 3,012,876 | A | 12/1961 | Eaton et al. |
| 3,211,548 | A | 10/1965 | Scheller et al. |
| 3,640,689 | A | 2/1972 | Glaski et al. |
| 4,010,249 | A * | 3/1977 | DuPont ....................... 423/657 |
| 4,042,664 | A | 8/1977 | Cardwell et al. |
| 4,311,520 | A | 1/1982 | Kruesi et al. |
| 4,720,300 | A | 1/1988 | Nishizawa et al. |
| 4,830,665 | A | 5/1989 | Winand |
| 5,102,632 | A | 4/1992 | Allen et al. |
| 5,776,329 | A | 7/1998 | Krynitz et al. |
| 5,787,332 | A | 7/1998 | Black et al. |
| 5,986,877 | A | 11/1999 | Pathare et al. |
| 6,171,363 | B1 | 1/2001 | Shekhter et al. |

(Continued)

OTHER PUBLICATIONS

PCT/US12/45364, Jul. 3, 2012 Orchard Material Technology, LLC International Search Report and Written Opinion dated Nov. 19, 2012.

(Continued)

*Primary Examiner* — George Wyszomierski
(74) *Attorney, Agent, or Firm* — Inna Y. Belopolsky, Esq.

(57) ABSTRACT

Recovery of a metal from scrap materials or other source materials containing two or more metals or other materials by iodization of the materials or parts of them to create multiple metal iodides of respective metals, separating the iodides and dissociating at least one of the iodides to recover its metal component.

14 Claims, 22 Drawing Sheets

(56) References Cited

U.S. PATENT DOCUMENTS

| | | |
|---|---|---|
| 6,238,456 B1 | 5/2001 | Wolf et al. |
| 6,958,257 B2 | 10/2005 | Rosenberg et al. |
| 7,102,229 B2 | 9/2006 | Rosenberg et al. |
| 7,479,301 B2 | 1/2009 | Eriksen |
| 2003/0110890 A1 | 6/2003 | He et al. |
| 2005/0232850 A1 | 10/2005 | Brown et al. |
| 2006/0174727 A1 | 8/2006 | Bick et al. |
| 2008/0110767 A1 | 5/2008 | Stoller et al. |
| 2008/0115627 A1 | 5/2008 | Wang et al. |
| 2009/0255372 A1 | 10/2009 | Olbrich et al. |
| 2010/0226070 A1 | 9/2010 | Yang et al. |
| 2010/0272889 A1 | 10/2010 | Shekhter et al. |
| 2011/0052481 A1* | 3/2011 | Terekhov et al. ............. 423/491 |

OTHER PUBLICATIONS

Blagoveshchenskiy, Y. V., et al, Tantalum and niobium nanopowders for nanoporous material creation, Rare Metals, vol. 28, Spec. Issue, Oct. 2009, p. 646.

Giannini, Gabriel, M., The Plasma Jet, Magnetohydrodynamic effects in an electric arc generate a beam of electrons and ions with a temperature of 30,000 degrees F., the highest maintained beyond an instant by a man-made device, Scientific American, Inc. 1957, pp. 80-88.

* cited by examiner

Iodization of cobalt: Starting composition 50kmol I₂ +1kmol Co

Iodization of zirconium: Starting composition 50kmol I₂ +1kmol Zr

RETRIEVAL OF HIGH VALUE REFRACTORY METALS FROM ALLOYS AND MIXTURES

REFERENCE TO RELATED APPLICATIONS

The present application claims priority from U.S. application 61/504,578 filed Jul. 5, 2011 which is incorporated herein by reference as though set out at length herein.

FIELD AND BACKGROUND OF THE INVENTION

The present invention provides a process of iodization and fractional distillation of metals, alloys and/or mixtures containing high value metals, including but not limited to, refractory metals in a wide range of weight percentages of such metals as included in various starting materials followed by reduction through use of a reducing agent or thermal decomposition, preferably hydrogen reduction, to recover some or all of the high value metals. In some instances novel forms of the recovered metal values are achieved.

There are known hydrometallurgical and pyrometallurgical methods for processing alloys, containing nickel and cobalt and also containing one or more of tantalum, rhenium, tungsten, molybdenum and/or other refractory metals (superalloys). For example as to hydrometallurgical processing, U.S. Pat. No. 5,776,329 of Krynitz et. al. (Jul. 7, 1998) teaches electrochemical oxidation of such alloys in an organic electrolyte and separation of alloying metals via chemical processing. The process is a complex one. It calls for various organic and inorganic electrolytes such as methanol, ethanol, isopropanol, phenol, lithium chloride, sodium nitrate, cobalt chloride, nickel chloride, ammonium chloride. A published US Patent Application 2009/0255372 by Olbrich et. al. (Oct. 5, 2009) discloses pyrometallurgical processing of a superalloy containing tungsten in a salt melt containing NaOH, $Na_2SO_4$ and other sodium containing oxidizers. Sodium tungstate is dissolved in water, thus being separated from the cake. The filter cake is again suspended in water and the metallic, magnetic fractions are separated from the oxide and hydroxide fractions. The hydroxide sludge is sent to a tantalum facility for digestion and recovering of tantalum, while the metal sludge is forwarded to a nickel facility for recovering of heavy metals.

In another example of the prior art, superalloys are processed via electrochemical decomposition of electrodes formed by a superalloy. The polarity of the electrolysis current is reversed with frequency of from 0.005 to 5 Hz (US Published Patent Application 2008/0110767 by Stoller et. al., May 15, 2000). Rhenium is recovered via ion exchange technology.

All prior art processes mentioned above are multi-step. They generate a variety of streams and are costly.

There are known techniques to recover tantalum and niobium via iodization of impure metals. Nishizawa et. al. in U.S. Pat. No. 4,720,300 (Jan. 19, 1988) disclose a process for producing niobium metal, which comprises iodizing niobium metal or niobium chloride containing at least tantalum as an impurity, then thermally decomposing the iodized product. It is practiced in a vacuum and has difficulties obtaining full Ta extraction.

Rosenberg et. al. in U.S. Pat. No. 6,958,257 (Oct. 25, 2005) and U.S. Pat. No. 7,102,229 (Sep. 5, 2006) describe a method for producing tantalum by first iodizing solid tantalum at 500-800° C., then decomposing $TaI_{5(gas)}$ in vacuum. Thermal decomposition of tantalum iodide in vacuum leads to unavoidable losses of tantalum in a form of $TaI_5$.

Scheller et al. in U.S. Pat. No. 3,211,548 (Oct. 12, 1965) disclose production of tantalum or niobium by hydrogen reduction of crude material sources of Ta, Nb and/or Ta, Nb chlorides in a plasma jet and compare it favorably vs. then prior art techniques such as electrolytic and thermite processes. They cite an article "The Plasma Jet" in Scientific American, vol. 197 (2) pp. 80 et. seq. (1957) re carbon reduction in a plasma furnace. An article by Yuri V. Blagoveshchenskiy et al. in the Journal of Rare Metals, vol. 28, Special Issue of October 2009, pp. 646 et seq. describe hydrogen/plasma reduction of tantalum and niobium chlorides for realization of nanoscale powders (5 to 100 nanometers) with a raw material evaporated into a gas stream mixed with a hydrogen gas stream in plasma and reduced to form condensed solid phase of powder particles which grow then to further heat treatment. The potential utility of the powders for use in making anodes for electrolytic capacitors is described as to enhancement of specific surface area, particle diameter/bulk density, flow rate and compressibility. Schaefer in U.S. Pat. No. 2,766,112 (Oct. 9, 1956) describe hydrogen reduction in mixed tantalum and niobium chlorides.

Eaton et al. in U.S. Pat. No. 3,012,876 (Dec. 12, 1961) show a fluidized bed reactor process producing metals such as Nb, Ta, Mo, W, by hydrogen reduction of their oxyhalides in the presence of a fluidized bed of salt particles (alkaline earth metal salts) to act as substrates for the acquired metals from the hydrogen reduction (e.g. Ta, Nb).

Glaski et al. in U.S. Pat. No. 3,640,689 (Feb. 8, 1972) use chemical vapor deposition to establish a refractory metal interface layer between a chemical substrate and a bond layer face metal such as refractory metal carbides, the intermediate and face layers being deposited from intermediate chlorides (but with bromides and iodides mentioned as alternatives). Chemical vapor deposition to coat a metal surface is also disclosed by J. Eriksen in U.S. Pat. No. 7,479,301 (Jan. 20, 2008) with metal (e.g. Ta, Nb, Mo, W) halides reduced by hydrogen (with periodically interrupted flow of the hydrogen) in the process to establish smooth, nonporous surfaces, but with follow-up polishing with reactive halogen gas (fluorine, chlorine, bromine or iodine) or hydrogen-halides (HF, HCl, HBr, HI).

R. Winand in U.S. Pat. No. 4,830,665 (May 10, 1989) discloses production of alloyed and unalloyed reactive metals (Ti, Zr, Hf, Ta, Nb, Mo, W, U, Be, Cr) in a continuous reaction of metal halide in a liquid state with a gaseous reducing agent (e.g. hydrogen) at a temperature above melting point of the metal and continuous withdrawal of a solidified ingot.

Many other references are similar to the above mentioned ones dealing with overcoming difficulties of producing refractory metal products from crude or advanced original sources or recycling spent products to recapture them. Prominent among these is the task of recapture of valuable metals from superalloys and other sources as discussed above in connection with the Krynitz et al, Olbrich et al, Mishizawa et al., Stoller et al. and other patents and published patent applications. The metals industry also targets certain end uses in strategies for economically producing high purity metals of controlled properties. These usages include superalloys for aerospace products such as airfoils and turbine engine parts, cemented carbide tools or tungsten or molybdenum radiation targets. The sources of materials that can be used include superalloys or other refractory metals recovered from spent devices or other scrap or crude source materials, targeting particularly the most valuable metals such as rhenium, tantalum, niobium, tungsten, molybdenum It is also desirable in such production processes to minimize collateral impurities such as metallic impurities and interstitial elements (e.g. oxygen, nitrogen, hydrogen, carbon) that can affect electrical or mechanical properties of end products.

SUMMARY OF THE INVENTION

It is an object of the present invention to create a simple process allowing recovery of refractory metals (Re, Ta, Nb, W, Mo, Zr, Hf) and optionally other metals including heavy metals (e.g. Ni, Co or Fe) from alloys and/or mixtures. One of the primary uses, of the processes of the present invention is in recovery of such metals from heavy metal superalloys. The source materials for refractory metal recovery can also be scrap products made of them in whole or in part, e.g., reject or used (spent) capacitors with Ta or Nb anodes, used x-ray or sputtering radiation targets or electrodes with W or Mo. The objects are realized by iodization and fractional volatilization and/or condensation of metal iodides followed by reduction of the iodides, preferably (for certain desired powder products) by hydrogen reduction in a plasma furnace process. The process must be efficient and reliable.

The process of the invention according to a preferred embodiment comprises these parts:

1. Iodization of an alloy or other mixed metals source to obtain iodides of ultra purity;
2. Separation of the metal iodides via their fractional volatilization and/or condensation;
3. Hydrogen reductions of gaseous ultra pure refractory metal iodides, resulting (depending on conditions of reductions used) (a) in a refractory metal powder of unique morphology, nanoscale average diameters with high surface area and hydrogen iodide or (b) a larger than nanoscale size of powder; and optionally:
4. Decomposition of hydrogen iodide and recirculation of iodine back to the above step 1 of the process and hydrogen back to the above step 3 of the process.

The iodization of the various metal mixtures can be replaced by other halogen treatments, i.e. by bromine, chlorine or fluorine to produce bromides, chlorides or fluorides of metals which can also be separated (for some such metal halides) by fractional volatilization and/or condensation.

The hydrogen reduction of each metal iodide to produce a nanoscale powder particle size of, e.g. tantalum is preferably carried out in a plasma furnace so that the chemical reaction is carried out in a short and controlled residence time with initial nucleation, growth and quick cooling to result in crystallization and limited growth to nanoscale solid powder particles of essentially spherical form that drop out of the plasma, without coalescing significantly into aggregates with other such particles.

One aspect of the present invention is a new process for production of tantalum-anode electrolytic capacitors and new such products made by such process. The process begins with scrap material sources of tantalum such as manufacturing rejects or used up capacitors, mill products or fabricated parts. The source material is iodized and this is followed by selective extraction of tantalum iodide from other products of the iodization by fractional distillation. The tantalum iodide (as gas or solid) is then fed to a plasma furnace simultaneously with hydrogen feed, the hydrogen being supplied in a 2-200 times excess over stoichiometric. As noted above, the tantalum can be formed into nanoscale (1-10 or $10\text{-}100 \times 10^{-9}$ meters diameter) in a narrow range of diameters (weight majority in a 0.5 to 1, 1 to 10 or $10\text{-}100 \times 10^{-9}$ range) with essentially spherical morphology. These particles can be cold pressed to a solid, porous aggregate (pellet) of about 30-40% of theoretical density and in such form, with such so-produced powder material, form an internal matrix area of uniform passage cross-sections. It is usually necessary to thermally treat the powder or pellet to minimize the defects (e.g., dislocations) content. The pellet can then be sintered to strengthen it. Some shrinkage of the pore areas may occur in sintering but it is substantially uniform—the variation of pore size/pore volume being contained substantially within a single order of magnitude (power of ten)—and the pore cross-section area in the pellet remains uniform and sufficiently large to enable penetration by a formation solution to form a thin tantalum pentoxide film at exposed powder surfaces (i.e. where not blocked by particle-to-particle bonding) and later penetration by a liquid electrolyte or a solid electrolyte liquid precursor (e.g manganese nitrate) that can convert through heating to solid electrolyte (manganese dioxide) in situ. Throughout the foregoing steps there is no need for the leaching or deoxidation steps customarily carried out for metal powder made by the customary process of sodium reduction of a potassium heptafluorotantalate followed by crushing and leaching of the metal-salt mixture formed by such reduction process to free the tantalum as powder and deoxidation or double deoxidation of the metal powder so obtained with magnesium. The deoxidation steps comprise leaching out excess Mg and MgO. Another recently emerged technology alternative to sodium reduction of potassium heptafluorotantalate is reduction of tantalum pentoxide with magnesium, but the tantalum obtained from that process also requires leaching and deoxidation. See, e.g., U.S. Pat. No. 6,171,363 (Shekhter et al.) granted Jan. 9, 2001 and U.S. Pat. No. 6,558,447 (Shekhter et al.) granted May 6, 2003. The present process does not require such leaching or deoxidation steps. The elimination of the prior art leaching and deoxidation steps creates a substantial cost saving and avoids new contamination problems that go with these steps. The pellets with anodic oxide formation on interior pore surfaces and liquid or solid electrolyte and a cathode connected to the electrolyte become electrolytic capacitors. The anodes/capacitors made from tantalum powders produced via the iodization and hydrogen reduction sequence described above, offer reliable, high specific capacitance (microfarad volts per gram and per cubic centimeter), low leakage, high effective series resistance (ESR) and high voltage breakdown (VBD) levels at low costs compared to products of the prior art processes. The iodization-hydrogen reduction sequence described above is also controllable to allow growth of newly formed particles above nanoscale where desired for some products. Production of larger powder particle sizes can be done by hydrogen reduction in furnaces such as a fluidized bed furnace, rotary kiln, pusher furnace, pusher tube furnace or batch muffle furnace. Whether produced at nanoscale or larger, the powders are obtained at high purity (very low levels of metallic impurities and of interstitial elements—oxygen, hydrogen, nitrogen, carbon). The tantalum or other recovered metal powder can be used in making mill products and fabricated parts or recycled to be blended into new superalloy production or production of other materials or devices.

Another aspect of the present invention is its use in separating metal oxides to recover at least one of the metal values in ultra purity form. A prime example of mixed metal oxides treatable to good effect, but not the only one, is the admixture of tantalum oxide and niobium oxide commonly found in ores and conventionally separated by digestion into ketone solutions, followed by complex and costly liquid-liquid extraction to achieve a tantalum double salt, potassium heptafluorotantalate, freed of niobium and ready for reduction by sodium and leaching/deoxidation steps. In the present process the mixed niobium oxide and tantalum oxide can be treated with iodine (or other halogen) to produce tantalum and niobium iodides (or other halides) that can be separated from each other by fractional volatilization or condensation and the tantalum halide can be hydrogen reduced in a plasma furnace or externally heated vertical furnace as noted above. This avoids the burdens of conventional practice and produces a unique product, as described above. Carbon must be added to the iodization (or other halogen treatment) process to capture oxygen produced in the halogen—oxides reactions as carbon monoxide which is easily removed. The target metal oxides can include tungsten oxide and molybdenum oxides Another aspect of the present invention is its use for recovery of refractory metal values (e.g. rhenium, tantalum, niobium, zirconium, molybdenum, chromium, tungsten, titanium) and/or heavy metal (cobalt, nickel, iron) metal values in superalloys or other specialty alloys used for making high performance aerospace and other vehicle and engine parts, radiation targets, machine parts (including cutting, milling, drilling tool bits) and corrosion resistant surfaces to withstand harsh environments and/or conditions including one or more of caustic or acidic media exposure, high temperature, high pressure, vibration, tension or torsion coatings or combinations. There are several classes of superalloys—some cobalt based, some nickel based, some iron based. Superalloys often include one or more of Ta, Ti, Hf, Mo, W, Nb, Cr in elemental or compound forms. The highest value target for recovery from a spent or reject such alloy is usually Re (rhenium) in those classes of superalloys including rhenium and the next highest value target is tantalum (Ta), though other components may be very valuable in particular instances. The material is comminuted and then put through the combined iodization-hydrogen reduction steps to achieve the target Re and/or Ta and/or other target metals. The rhenium and tantalum iodides if occurring together would be separated from each other and then separately hydrogen reduced. Reduction product metal powders are easily withdrawn and there is no significant coating residue left in the furnace environment.

Other objects, features and advantages will be apparent from the following detailed description of preferred embodiments taken in conjunction with the accompanying drawings in which:

DETAILED DESCRIPTION OF PREFERRED EMBODIMENTS

1. Iodization

Iodization of metals of a typical superalloy mix and stability of their iodides was calculated using HSC Chemistry for Windows Software (version 6.1). Initial mole ratio of 50:1 ($50I_2$-1Me) was used in all calculations. The temperature range was 25-1500° C. The equilibrium compositions for Ta—I, Fe—I, Ni—I, Re—I, W—I, Mo—I, Nb—I, Co—I and Zr-1 systems are shown in FIGS. 1-9. The mole ratio (kmol:kmol) of iodine to metal in the above example was 50 to 1 but other ratios can be employed to good effect. In practice, the iodine can be supplied as a gas, liquid or solid, preferably as a solid, to a furnace also containing the alloy, preferably in a particulate form. It can be seen from FIGS. 1-9 that all these metals (Re, Ta, Nb, Fe, Ni, W, Mo, Co, Zr) can be iodized at low temperatures. All these metal iodides but rhenium iodide are in either solid or liquid phase at low temperatures. Rhenium is volatilized in a form of $ReI_{3(g)}$; therefore it can be separated from an alloy or other multi-metal source including rhenium at low temperatures.

Figure 3:
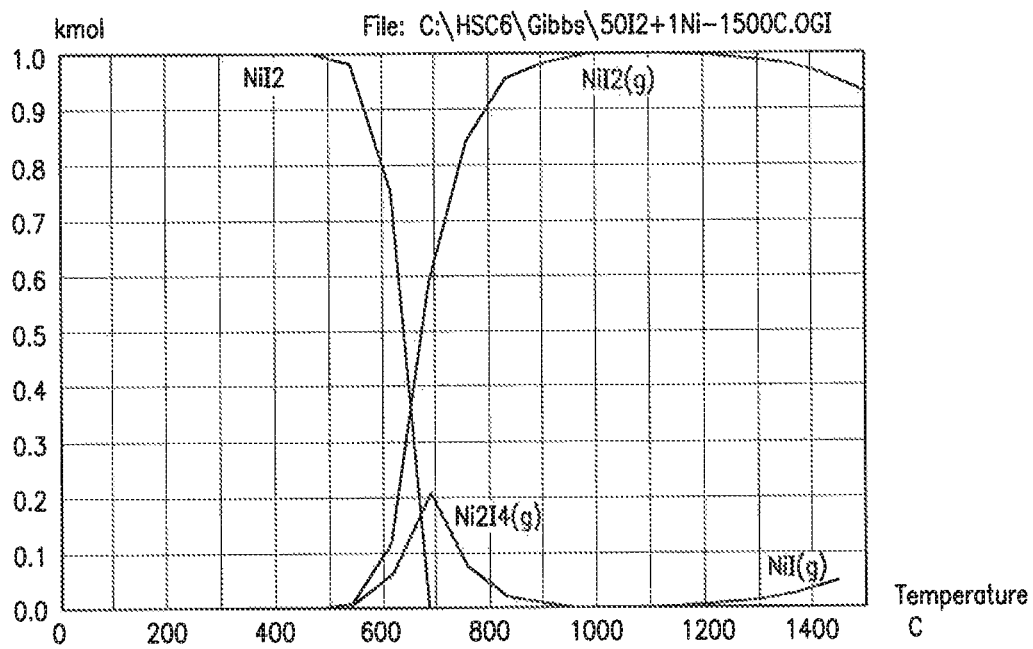
FIG. 3 is a graph showing iodization of nickel and thermal stability of $NiI_2$.
Figure 4:
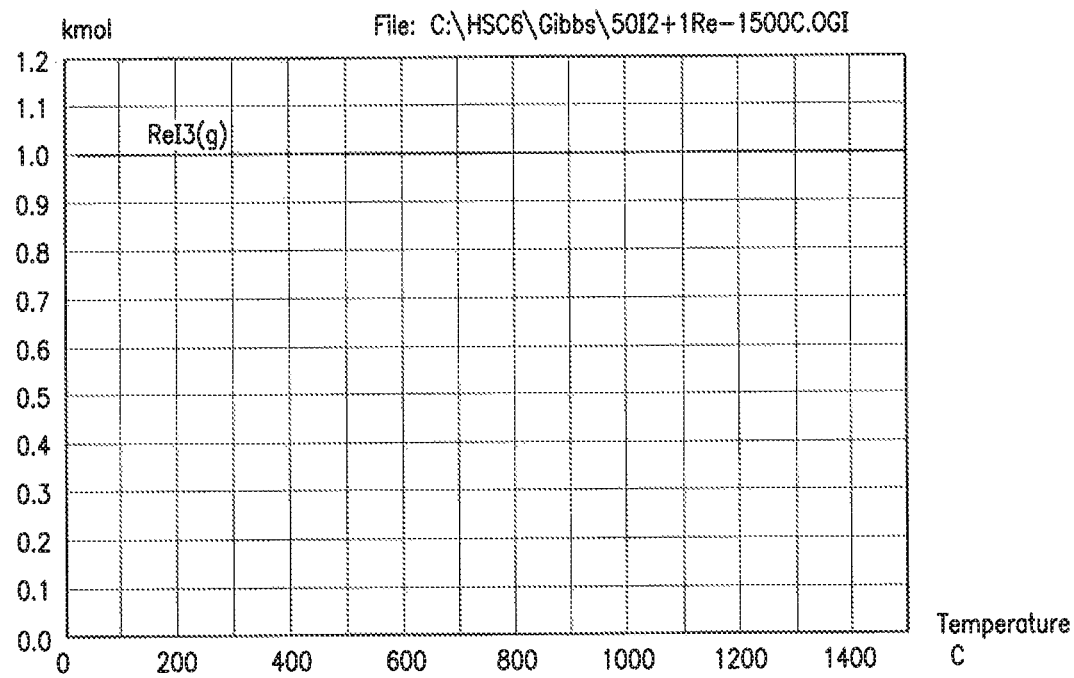
FIG. 4 is a graph showing iodization of rhenium and thermal stability of $ReI_{3(g)}$.
Figure 5:
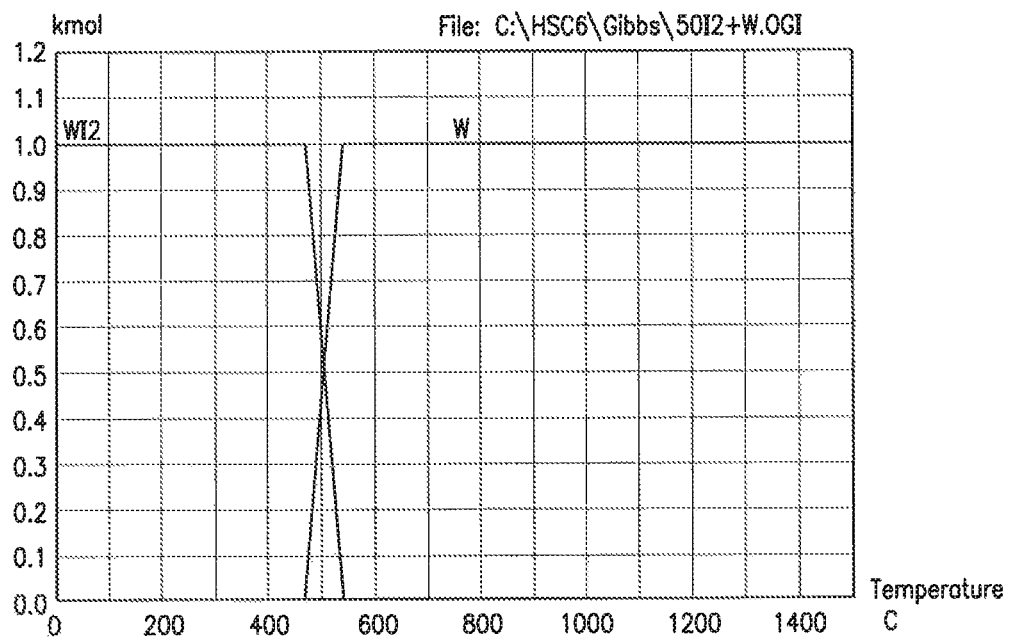
FIG. 5 is a graph showing iodization of tungsten and thermal stability of $WI_2$.
Figure 6:
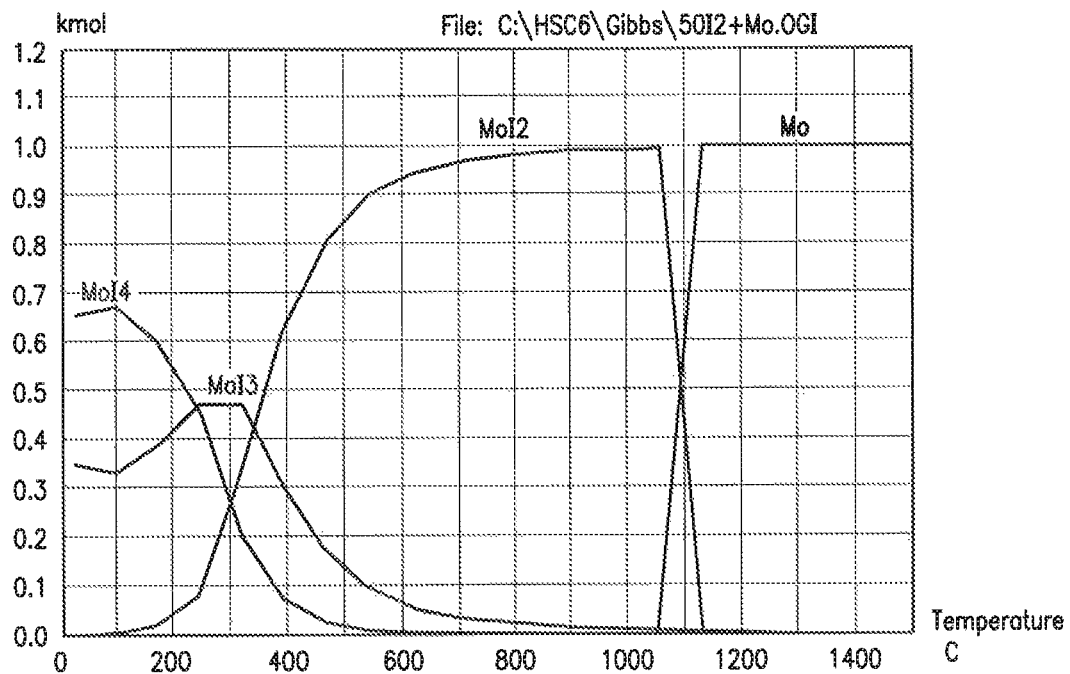
FIG. 6 is a graph showing iodization of molybdenum and thermal stability of $MoI_2$.

Other metal iodides can be either volatilized or decomposed at different temperatures, thus creating a prospect of their separation by either fractional sublimation or thermal decomposition. Molybdenum and tungsten iodides do not sublime. Tungsten (II) iodide start decomposing at ~480° C. (FIG. 5). There is a complex equilibrium between various molybdenum iodides. As the temperature rises, they are converted into $MoI_2$ (FIG. 6). Molybdenum (II) iodide starts decomposing at approximately 1060° C., forming molybdenum meta The onset temperature of iron (II) iodide sublimation is ~330° C. Nickel (II) iodide starts evaporating ~500° C. (FIG. 3). At approximately 690° C. the entire amount of nickel is in the gaseous phase in a form of $NiI_{2(g)}$ species.

Figure 1:
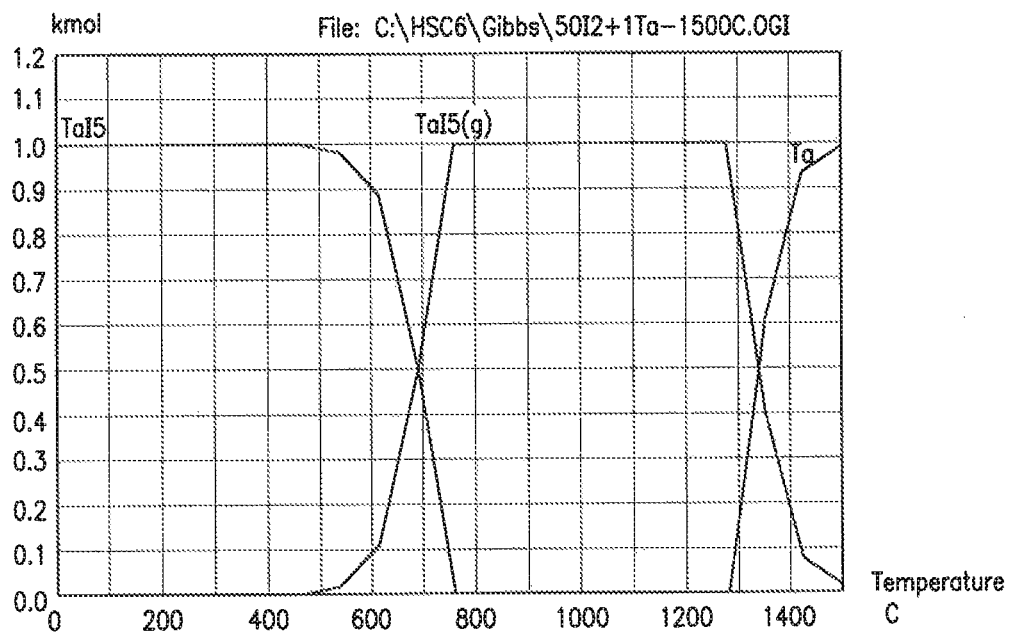
FIG. 1 is a graph showing iodization and thermal stability of $TaI_5$.
Figure 2:
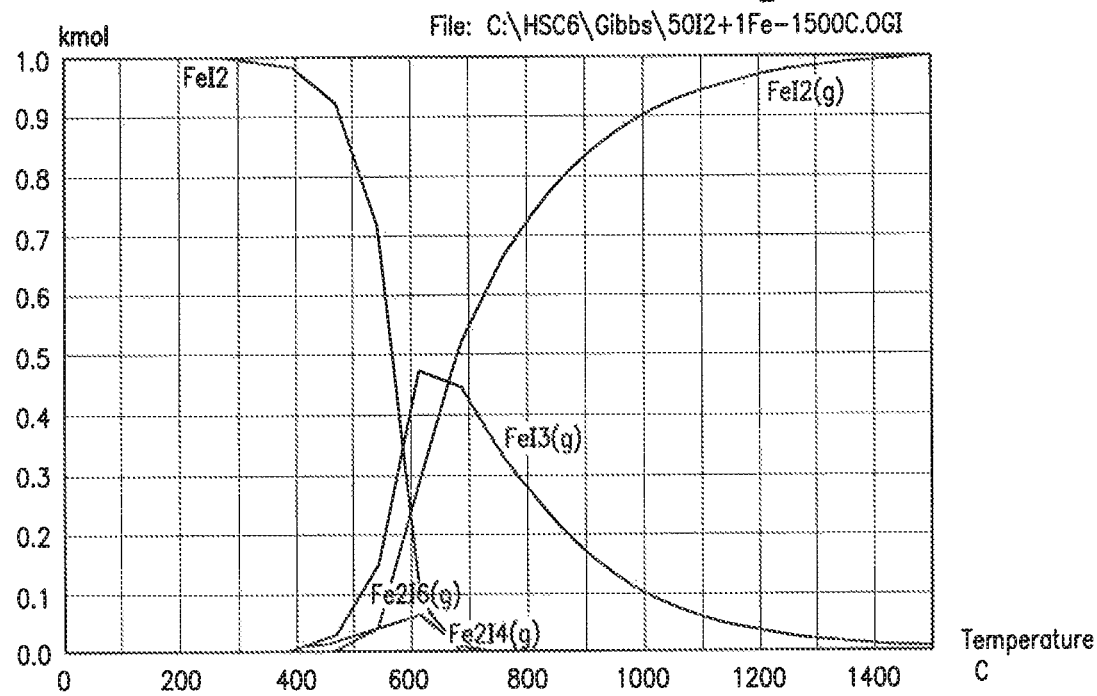
FIG. 2 is a graph showing iodization of iron and thermal stability of $FeI_2$.
Figure 7:
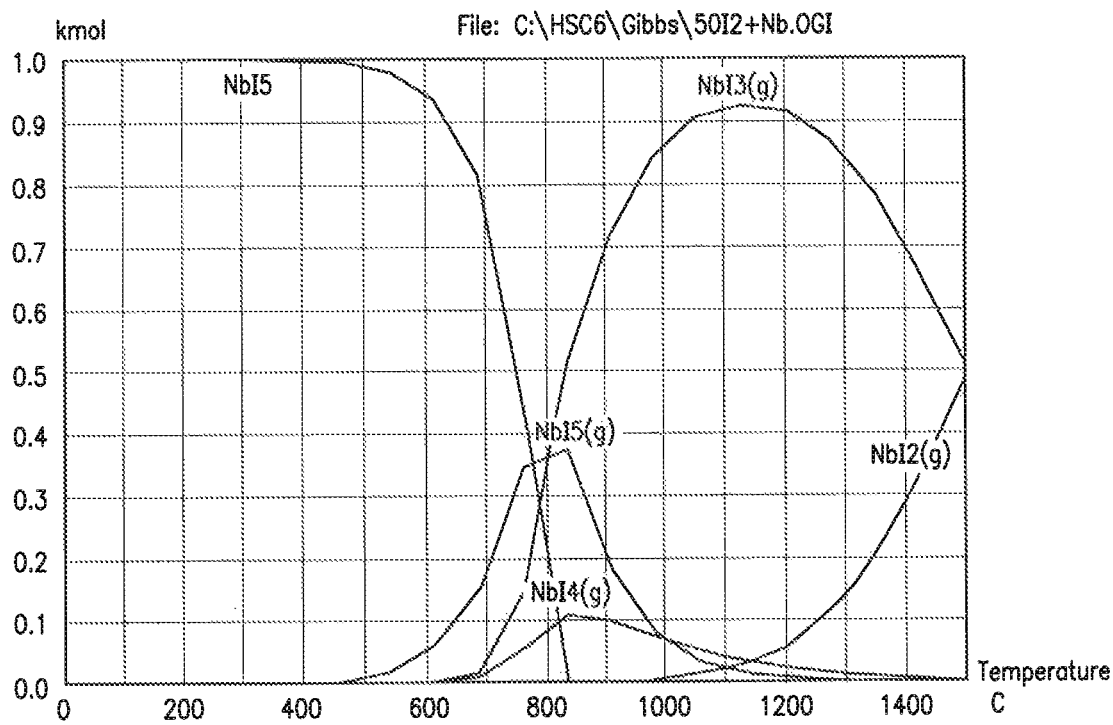
FIG. 7 is a graph showing iodization of niobium and thermal stability of $NbI_5$.
Figure 9:
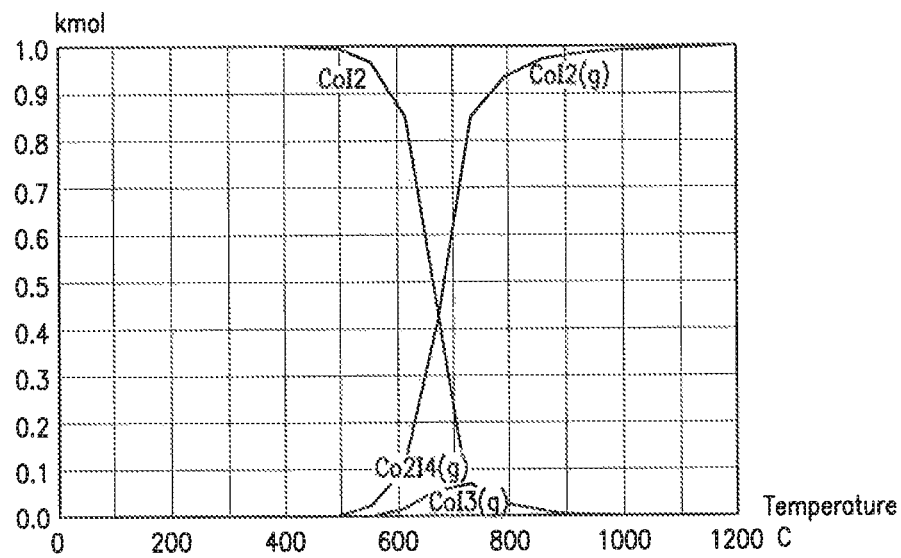
FIG. 9 is a graph showing iodization of cobalt and thermal stability of $CoI_2$.
Figure 8:
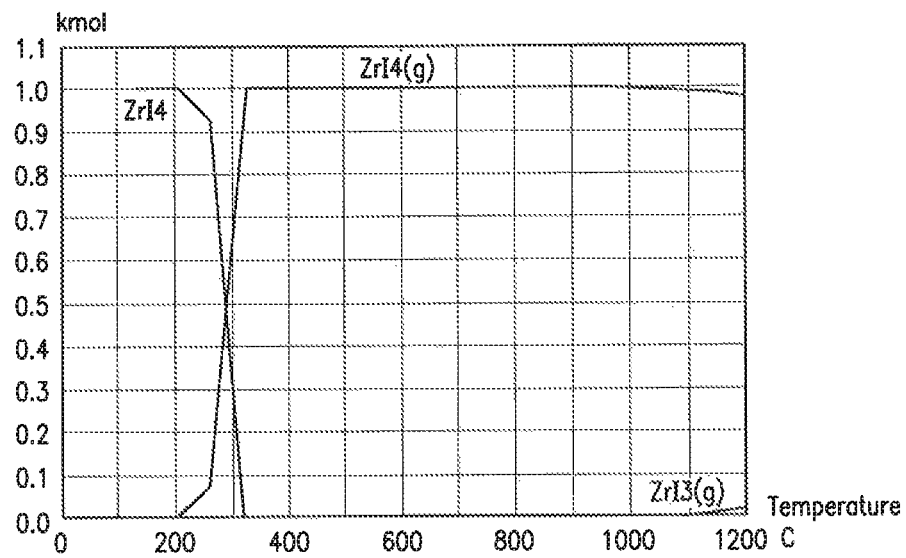
FIG. 8 is a graph showing iodization of zirconium and thermal stability of $ZrI_4$.

Tantalum (V) and niobium (V) iodides start vaporizing at about 470 and 400° C. respectively, when the tantalum or niobium are present in pure forms (FIGS. 1 and 7). The volatilization temperatures will increase when an alloy source of metal is iodized since thermodynamic activity changes, but there will remain a difference of volatilization temperatures. The same is true for alloy sources of other alloying components, e.g. Re, Ni, Fe, Co, etc. Therefore, these iodides can be separated by fractional distillation ($ReI_3$, $NiI_2$, $FeI_2$, $TaI_5$, $NbI_5$). Rhenium iodide exists as a gaseous species.

2. Separation of Gas Phases

The iodide gasses of mixed metals can be taken as off-gasses at increasing temperatures and/or sequentially condensed at decreasing temperatures.

3. Hydrogen Reduction of Metal Iodides

It is particularly advantageous to use hydrogen as the reducing agent. The hydrogen itself can be made by various methods including dissociation of hydrides, electrolysis of water, or as described in U.S. Pat. No. 7,261,874 of Lahoda and Task (Westinghouse) utilizing sulfur-iodine reaction or through use of products of the looping sulfide oxidation reaction described in the co-pending application of McHugh and Shekhter (Orchard Material Technology) Ser. No. 13/176,268, filed Jul. 5, 2011, and the contents of all the patents and applications are incorporated herein by reference as though set out at length herein.

Figure 10A:
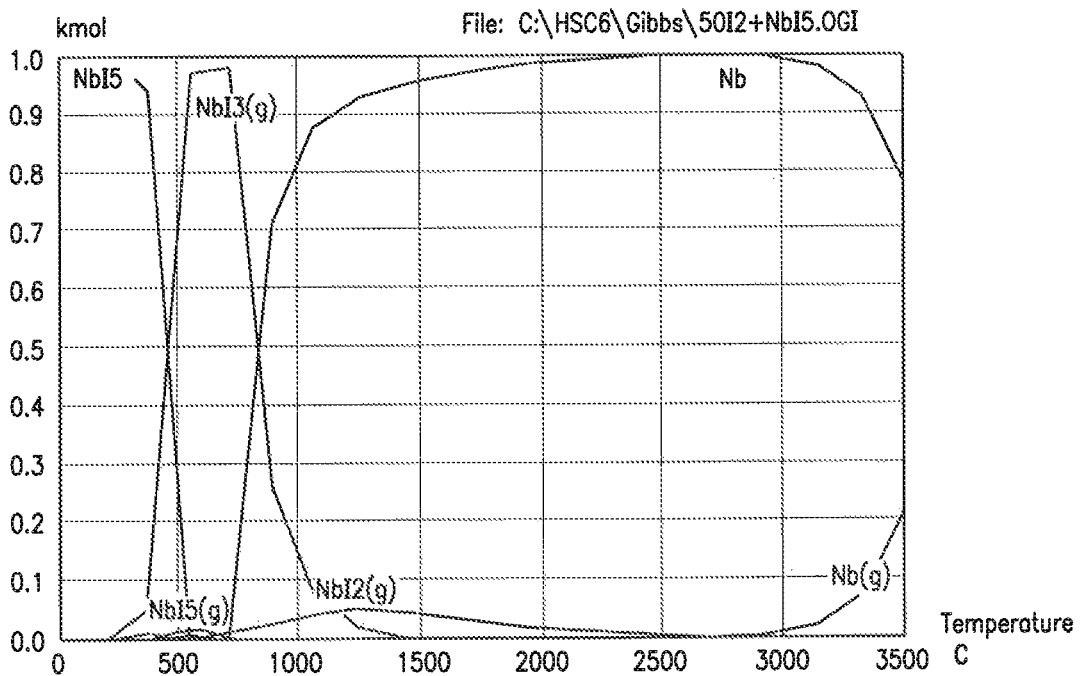
FIGS. 10A, 10B, 10C, 10D, 10E and 10F are graphs showing the equilibrium composition for the reductions of metal iodides (of niobium (V), tantalum (V), nickel (II), rhenium (III), zirconium (IV) and cobalt (II)) with hydrogen.
Figure 10B:
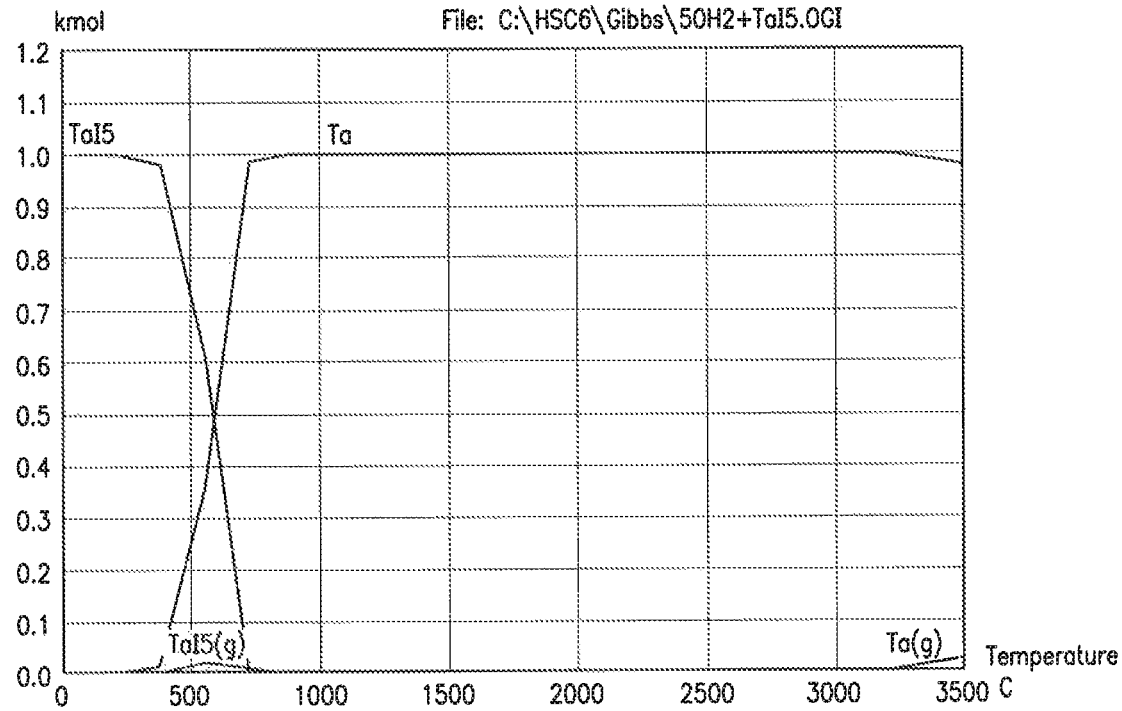
Figure 10C:
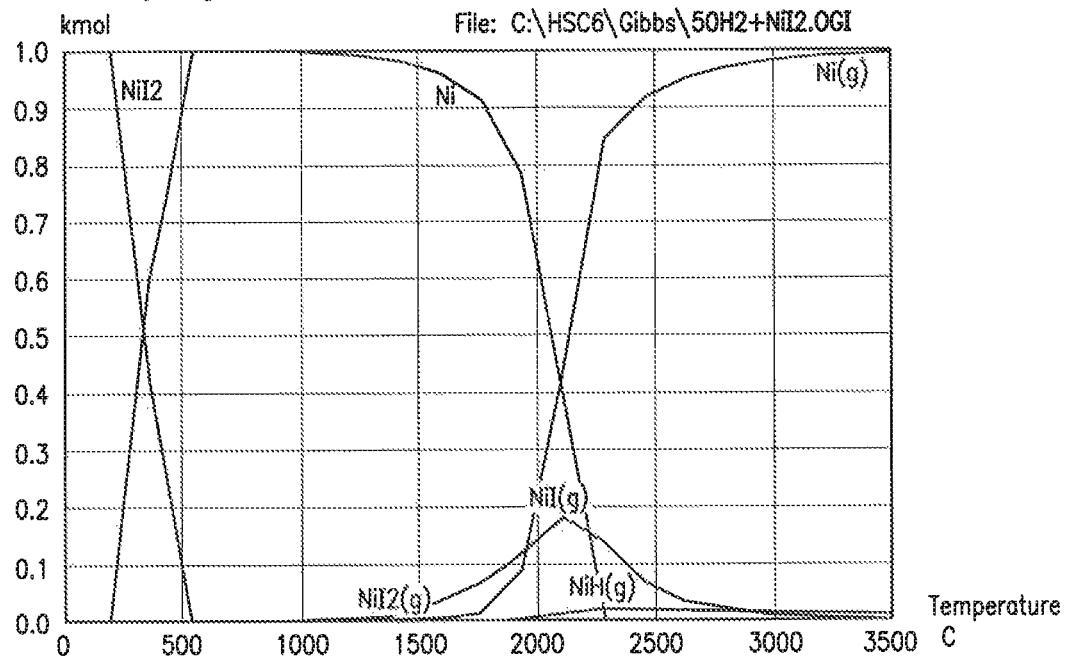
Figure 10D:
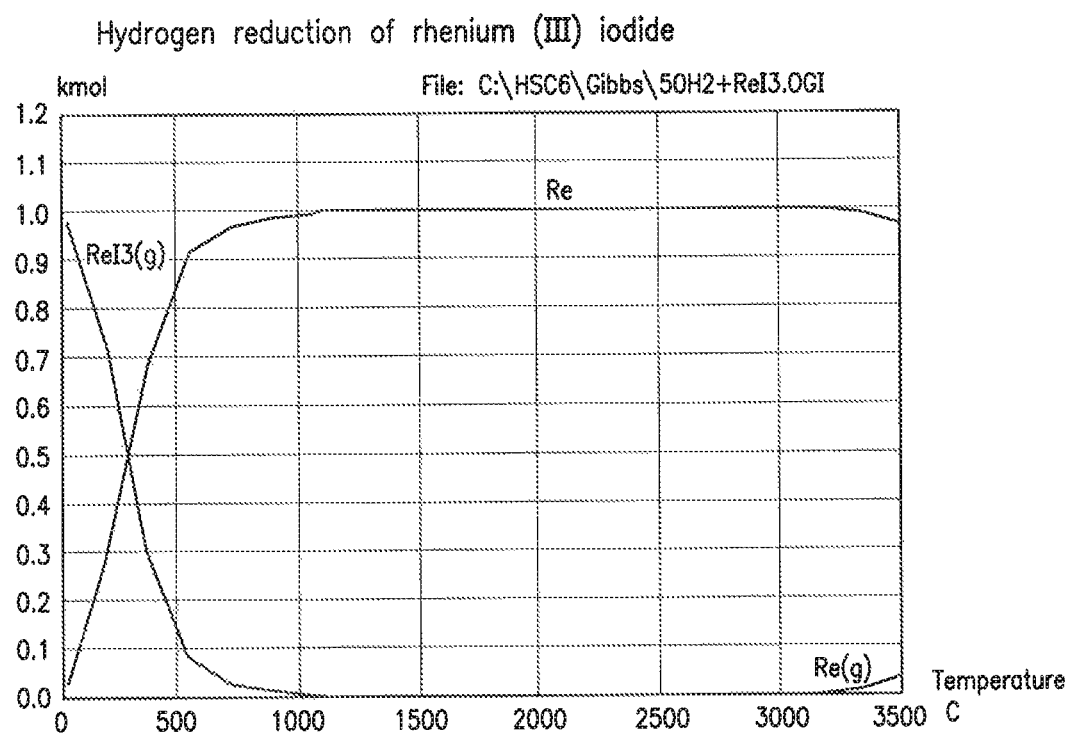
Figure 10E:
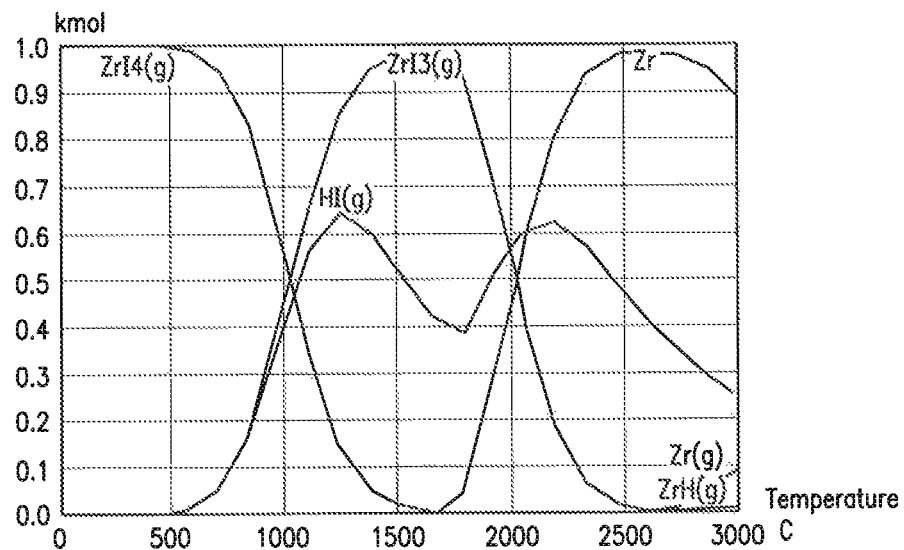
Figure 10F:
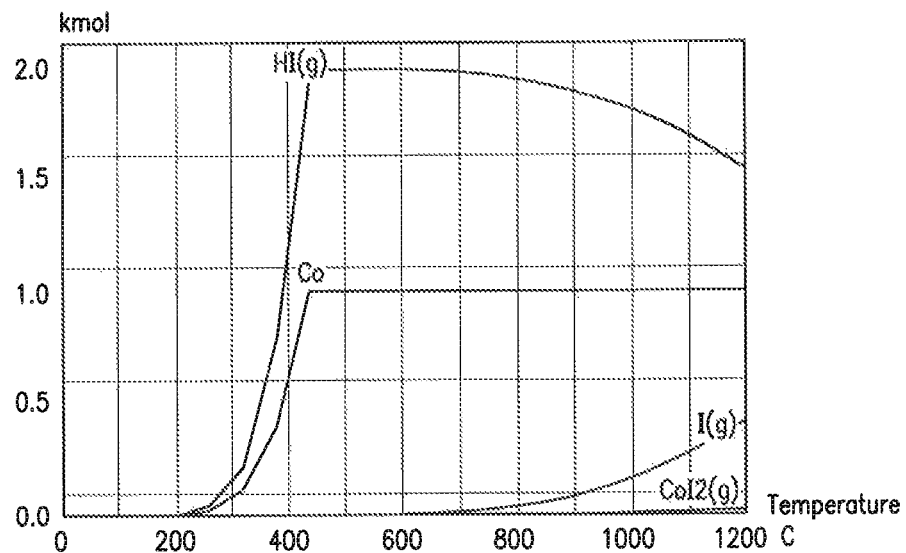

After separation of iodides it becomes feasible to recover metals from them. We discovered that the most efficient way to recover most of the above metals from their iodides is hydrogen reduction of the iodides or in some cases (e.g. W, Mo) thermal decomposition. Hydrogen reduction technology allows for practically complete recovery of a metal as compared to the thermal decomposition of an iodide, for example, thermal decomposition of $TaI_5$ (FIG. 1). The thermodynamic simulation of reduction of metal iodides with hydrogen was carried out using HSC Chemistry for Windows 6.1 thermochemical software. The starting conditions for the simulations were: hydrogen/iodide mole ratio 50/1; temperature range of 25-3500° C.; total pressure 1 Bar. The results are shown in FIGS. 10A-10E. It can be seen from these figures that the recovery of metals from their iodides via hydrogen reduction technology is thermodynamically feasible, typically at high temperatures. For example, practically 100% reduction of tantalum from its iodide can be obtained at the temperatures above 900° C. (FIG. 10B). Rhenium can be completely recovered from its iodide at above 1200° C. (FIG. 9D).

Hydrogen reduction of gaseous metal iodides in plasma furnace or vertical flow furnace will create metal powders with unique properties (high surface area, low bulk density, extremely small particle size and unique morphology), all adding up to new products affording new and beneficial properties. Metal nucleation starts in gas phase. Preferably, the temperature of the environment of nucleation is held close to the bulk (e.g., ingot) melting point of the metal powder. The nucleating metal particles will be of nanoscale size and will have a lower melting point compared to bulk (e.g. ingot) melting point due to the increased contribution the surface Gibbs energy to the total Gibbs energy of the solid powder. This can be calibrated for different materials. These unique features can be attained when the reduction process is carried out in a plasma type furnace with very short dwell times of the metal particles formed by reduction of the metal iodides in the plasma plume. Due to the extremely short dwell time very small particle sizes of nanoscale can be achieved.

The particles obtainable through this method will be in a range of 1-10 or $10-100 \times 10^{-9}$ meters (i.e. nanoscale) average particle diameter with extremely high surface area (10-100 $m^2/g$) well above the surface area obtainable by sodium reduction of $K_2TaF_7$, or magnesium reduction of $Ta_2O_5$ since they cool down (quench) at very fast rates and therefore will not tend to self-sinter or otherwise cluster to an adverse extent. Extraordinary porosity can be obtained in sintered or pressed nanoscale, high surface area, essentially spherical particles, thus enabling enhanced further processing and superior end use products. For example, the tantalum powder and sintered pellets made of such powder are used in making capacitor anodes with the ability to eliminate usual state-of-the-art leaching and deoxidation steps for removal of oxygen and other impurities. The powders can be cold pressed to anode form and sintered. The spherical form and substantially uniform size of particles enhances their flowability in pressing equipment. The next steps are electrolytically forming (anodizing) the oxide layers on the exposed surface areas of pressed and sintered particles, impregnation with a precursor solution of manganese nitrate salt and heating to produce solid manganese dioxide as solid electrolyte material in the pores (or, alternatively, use of the pellets in liquid electrolyte capacitor constructions), and finally encasing in a metallic cathode, (e.g. carbon or silver) and packaging, with testing at various steps known per se. Through the process of the present invention one obtains a powder that can be immediately pelletized in an inert atmosphere and sintered in inert atmosphere or vacuum, thus avoiding random oxidation and avoiding need for deoxidation and leaching and achieving a high and uniform pore size volume and a narrow band of pore size/cross-sections (in a single order of magnitude range, i.e. 1 to 10 times) in diverse directions to enable uniform access of oxidizing process electrolyte for surface oxide formation and, later, of electrolyte material (e.g. manganese nitrate) which is solidified in place (as manganese dioxide) in the process. This results in high capacitance, low leakage, low effective series resistance (ESR), high voltage breakdown capacitors formed in high yields with continuity of processing from source material (e.g. superalloys or tantalum scrap per se) to end product. It provides resultant consistent characteristics at low cost per microfarad-Volts/gram or microfarad-Volts/cc.

Similar advantages can be realized in processing any of the refractory metals cited above for use in making electrolytic devices, mill products or structural complete fabricated products with advantages of three dimensional strength and stiffness and fracture resistance. Similarly, other heat dissipating components can be formed. The invention can also be used to form substrates for integrated circuits and discrete components and circuit overlays. The products can be of wire, rod, disc, plate, cylinder forms and other forms. Fabricated parts can also include re-use of the extracted metals to reform superalloys, e.g. for jet engine turbine blades and leading edges of wings, fins of the aircraft and fixed parts, such as on struts and stators, nozzles and cylinders within the turbine engine. Rhenium, tantalum, niobium, tungsten, molybdenum, are among valuable recovery targets, especially rhenium and tantalum can be hydrogen reduced and processed as described above.

Another use of the process of the present invention is a major contribution to the art of separating tantalum and niobium. These metals often occur together in ores and are very difficult to separate. For nearly a century and a half the principal method for such separation has been derivations from the Marignac process of preferential extraction from mixed aliphatic ketone solutions via counter-current processing of liquid extraction arrays. It is a laborious and costly process. Through the present process mixed tantalum and niobium oxides from ores and other sources can be iodized, the iodides separated by sequential volatilization or condensation and the separated tantalum and niobium iodides can be hydrogen reduced to tantalum and niobium powders. Iodization of tantalum oxide is achieved at 1100° C. and of niobium oxide at 900° C. Carbon is added to sequester, as easily moved carbon monoxide, the oxygen liberated in the iodization reaction. This can be achieved wholly omitting the prior art liquid solution preparations, and as noted above omitting sodium reduction of tantalum heptafluorotantalate and leaching and deoxidation steps for the sodium reduced product (and also for the product of magnesium reduction of tantalum pentoxide described in the Shekhter et al. patents cited above), thus dramatically changing the nature of the tantalum powder and tantalum capacitor industries. The iodization of mixed metal oxides with removal of freed oxygen is also usable in other contexts.

4. Hydrogen Iodide Treatment

The byproducts of hydrogen reduction of metal iodides are excess hydrogen and hydrogen iodide. They can be easily separated from a metal powder, as they are in a gaseous form.

Hydrogen iodide decomposes at low temperatures producing hydrogen and iodine according to the reaction shown in Table 1.

TABLE 1

$2HI_{(g)} = H_{2(g)} + I_2$

| T C. | ΔH kcal | ΔS cal/K | ΔG kcal | K |
|---|---|---|---|---|
| 20.000 | −1.618 | −0.232 | −1.550 | 1.432E+001 |
| 40.000 | −0.969 | 1.909 | −1.567 | 1.241E+001 |
| 60.000 | −0.299 | 3.982 | −1.626 | 1.166E+001 |
| 80.000 | 0.394 | 6.004 | −1.726 | 1.170E+001 |
| 100.000 | 1.113 | 7.983 | −1.866 | 1.239E+001 |
| 120.000 | 5.629 | 19.678 | −2.107 | 1.484E+001 |
| 140.000 | 6.478 | 21.785 | −2.522 | 2.159E+001 |
| 160.000 | 7.344 | 23.831 | −2.978 | 3.183E+001 |
| 180.000 | 8.226 | 25.822 | −3.475 | 4.743E+001 |
| 200.000 | 9.125 | 27.763 | −4.011 | 7.125E+001 |
| 220.000 | 10.041 | 29.658 | −4.585 | 1.077E+002 |
| 240.000 | 10.973 | 31.510 | −5.197 | 1.635E+002 |
| 260.000 | 11.921 | 33.324 | −5.845 | 2.491E+002 |
| 280.000 | 12.887 | 35.101 | −6.530 | 3.802E+002 |
| 300.000 | 13.869 | 36.845 | −7.249 | 5.813E+002 |
| 320.000 | 14.868 | 38.558 | −8.003 | 8.894E+002 |
| 340.000 | 15.883 | 40.242 | −8.791 | 1.361E+003 |

[Note:
The thermochemical data for HI is uncertain, but within the limits of certainty, it is clear that ΔG will be negative. See the Lahoda and Task (Westinghouse) reference cited above. Hydrogen can be recycled into the hydrogen reduction step while iodine can be looped back into the iodization process].

5. Iodization of Refractory Metal Oxides

We discovered that metal iodides can be produced not only from the metal scrap and mixtures, but also from single or mixed metal oxides. It can be seen from Tables 2 & 3 below (ΔG becomes negative) that tantalum and niobium iodides can be produced from their oxides at the temperatures above 1100 and 900° C., respectively. Carbon must be used to remove oxygen in a form of carbon monoxide. Hydrogen reduction of the iodized oxides will be followed by the recovery of the hydrogen and iodine products as described above.

TABLE 2

Iodization of tantalum (V) oxide
$Ta_2O_5 + 5I_2 + 5C = 2TaI_{5(g)} + 5CO_{(g)}$

| T C. | ΔH kcal | ΔS cal/K | ΔG kcal | K |
|---|---|---|---|---|
| 200.000 | 275.942 | 236.102 | 164.231 | 1.364E−076 |
| 300.000 | 270.710 | 226.080 | 141.132 | 1.514E−054 |
| 400.000 | 265.185 | 217.200 | 118.976 | 2.339E−039 |
| 500.000 | 259.452 | 209.263 | 97.661 | 2.464E−028 |
| 600.000 | 253.573 | 202.114 | 77.098 | 5.021E−020 |
| 700.000 | 247.577 | 195.613 | 57.216 | 1.410E−013 |
| 800.000 | 241.475 | 189.645 | 37.957 | 1.859E−008 |
| 900.000 | 235.278 | 184.124 | 19.272 | 2.567E−004 |
| 1000.000 | 228.993 | 178.984 | 1.120 | 6.423E−001 |
| 1100.000 | 222.626 | 174.170 | −16.535 | 4.285E+002 |
| 1200.000 | 216.179 | 169.638 | −33.724 | 1.008E+005 |
| 1300.000 | 209.652 | 165.352 | −50.471 | 1.029E+007 |
| 1400.000 | 202.491 | 160.941 | −66.788 | 5.306E+008 |
| 1500.000 | 195.665 | 156.979 | −82.682 | 1.556E+010 |
| 1600.000 | 188.837 | 153.233 | −98.191 | 2.867E+011 |
| 1700.000 | 182.007 | 149.681 | −113.336 | 3.583E+012 |
| 1800.000 | 175.171 | 146.301 | −128.133 | 3.227E+013 |
| 1900.000 | 139.594 | 129.713 | −142.292 | 2.048E+014 |
| 2000.000 | 132.507 | 126.525 | −155.103 | 8.193E+014 |

TABLE 3

Iodization of niobium (V) oxide
$Nb_2O_5 + 5I_2 + 5C = 2NbI_{5(g)} + 5CO_{(g)}$

| T C. | ΔH kcal | ΔS cal/K | ΔG kcal | K |
|---|---|---|---|---|
| 200.000 | 242.568 | 234.090 | 131.808 | 1.295E−061 |
| 300.000 | 237.391 | 224.175 | 108.906 | 2.947E−042 |
| 400.000 | 231.924 | 215.388 | 86.936 | 5.921E−029 |
| 500.000 | 226.256 | 207.540 | 65.797 | 2.508E−019 |
| 600.000 | 220.453 | 200.483 | 45.402 | 4.315E−012 |
| 700.000 | 214.552 | 194.085 | 25.678 | 1.709E−006 |
| 800.000 | 208.571 | 188.235 | 6.566 | 4.598E−002 |
| 900.000 | 202.527 | 182.851 | −11.984 | 1.709E+002 |
| 1000.000 | 196.436 | 177.869 | −30.017 | 1.423E+005 |
| 1100.000 | 190.311 | 173.238 | −47.570 | 3.731E+007 |
| 1200.000 | 184.161 | 168.914 | −64.675 | 3.941E+009 |
| 1300.000 | 177.995 | 164.865 | −81.362 | 2.014E+011 |
| 1400.000 | 171.822 | 161.060 | −97.656 | 5.715E+012 |
| 1500.000 | 165.650 | 157.478 | −113.581 | 1.001E+014 |
| 1600.000 | 133.300 | 139.442 | −127.896 | 8.386E+014 |
| 1700.000 | 125.697 | 135.488 | −141.641 | 4.895E+015 |
| 1800.000 | 118.089 | 131.727 | −155.000 | 2.195E+016 |
| 1900.000 | 110.476 | 128.140 | −167.992 | 7.872E+016 |
| 2000.000 | 102.856 | 124.712 | −180.634 | 2.335E+017 |

It can be seen from Tables 2 and 3 that the onset temperatures for $Ta_2O_5$ and $Nb_2O_5$ iodization are around 1100 and 900 degrees C., respectively (negative delta G).

6. Process

The source material to be treated is comminuted or otherwise converted to particulate form under controlled environment conditions (e.g. argon or other inert gas environment) to a size range suitable for essentially complete iodization of the target refractory metals, then heated in a furnace with an iodine gas in-feed, e.g. a sealed furnace with a slight positive pressure of iodine and inert carrier gas (e.g. Ar or He) in gas phase. Alternatively, the initial charge can be a particulate metal source. The charge is fed as a stream through the furnace via gas locks. In all such instances metal iodide gasses are produced that can be drawn off separately as produced at different temperatures and the iodide compounds of target metals are fed to one or more plasma reactors for hydrogen reduction to free the respective metals. Other reactors, aside from plasma furnaces can be used, e.g. an externally heated vertical furnace with means for removal of the produced metal. The hydrogen iodide is then dissociated by known per se steps/means to produce hydrogen and iodine, either or both of which can be looped back to (re)usage in the prior steps to enhance overall recovery efficiency and cost.

Figure 11:
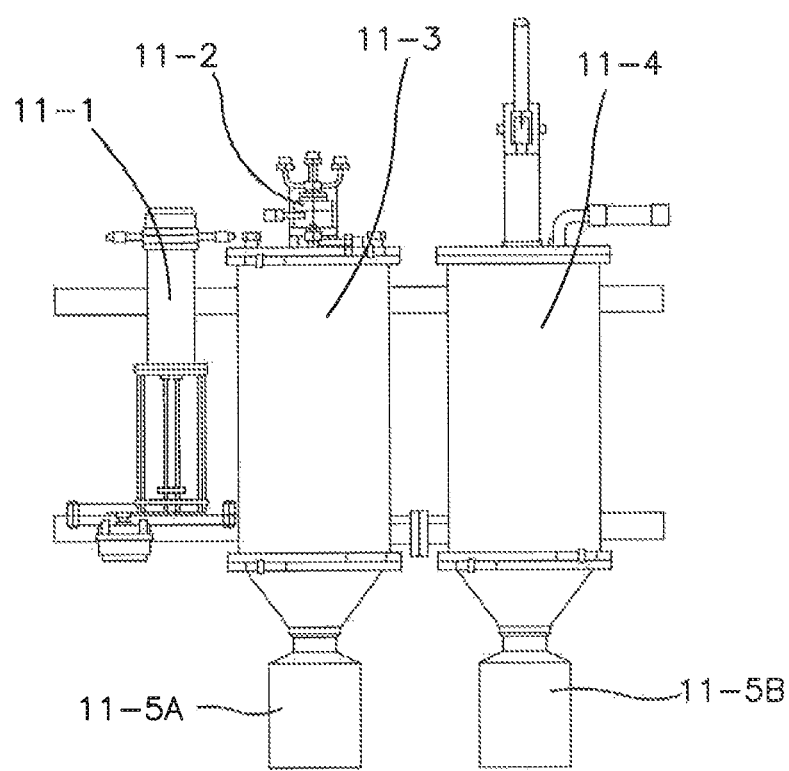
FIG. 11 is a layout of equipment for the reduction step of the processes.

Referring to FIG. 11 there is shown an apparatus for practice of the hydrogen reduction step of the process comprising a raw material feeder 11-1, a plasma generator 11-2 coupled to a reactor vessel 11-3 and a filter vessel 11-4 with recovered metal collection containers 11-5 A and B. The metal iodide (or metal bromide, fluoride or chloride) can be charged in gas or solid state form to a vessel that is sealed or fed into it continuously or intermittently via gas-lock means. An inert gas (e.g. argon) is also provided to the furnace to serve as a carrier gas to control the temperature of the reaction and/or the feed rate of a halide. The reaction in reactor vessel 11-3 proceeds in hundredths of a second including stages of evaporation and reduction and/or thermal decomposition for forming metal from its oxide (or bromide or chloride or fluoride), with nucleation of the metal beginning in gas phase, and then the metal is removed as solid particles with very little grain growth. Where the temperature is kept close to metal melting point or above it (calibrated to allow for size and heating effect or lowering the melting point as described above) the metal takes an essentially spherical powder form of uniform small diameter of nanoscale size. Tungsten and molybdenum can be thermally decomposed in a plasma furnace fed with inter gas or in non-plasma type furnaces with inert gas environments, e.g. fluidized bed furnace, rotary kiln, pusher furnace, pusher tube furnace, or batch muffle furnace. Most of the metal powders in reactor 11-3 fall into container 11-5A. Some of the metal powders are entrained in a gas flow from reactor 11-3 to filter vessel 11-4 and condensed and collected at collection vessel 11-5B.

Figure 12:
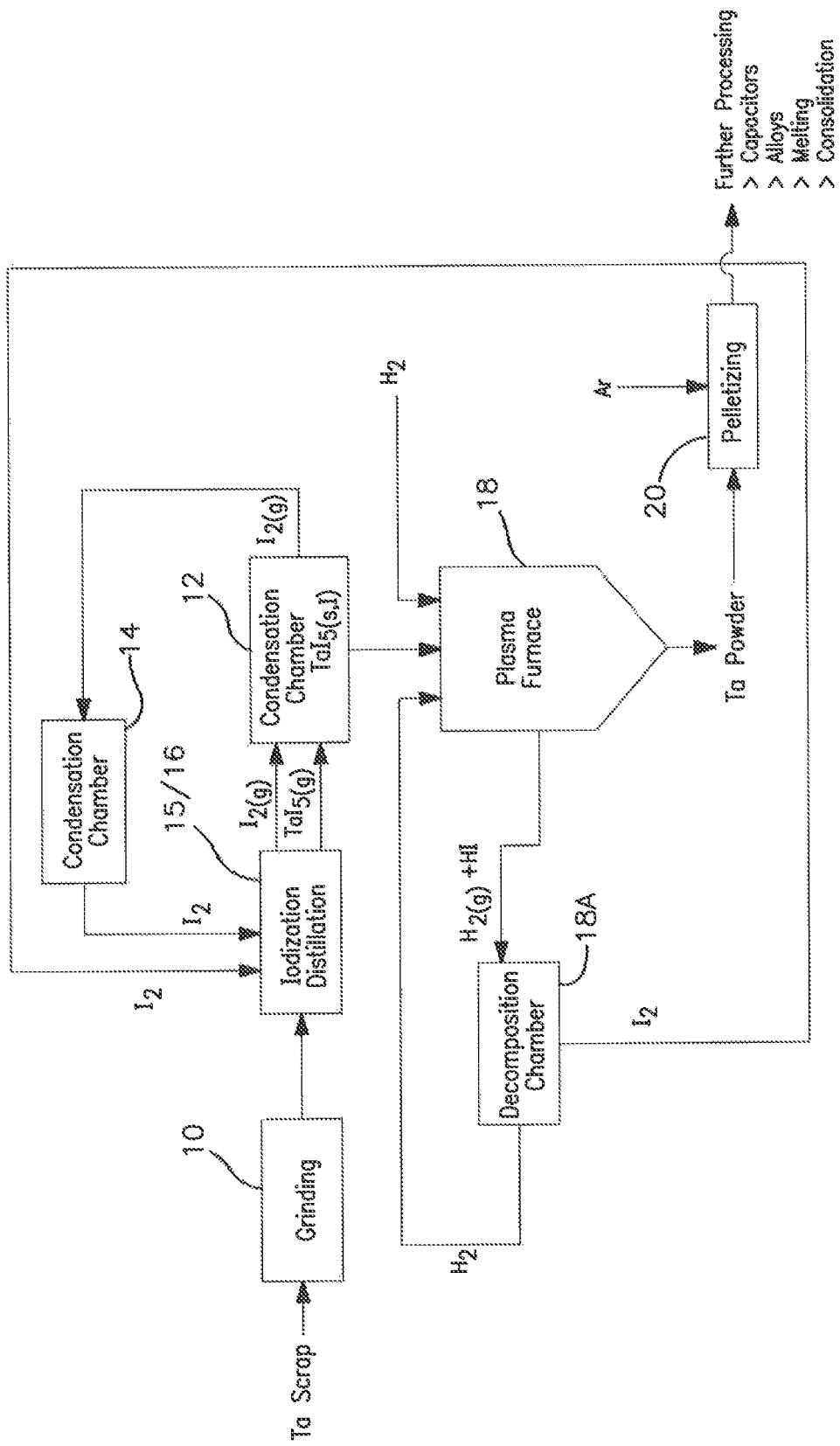
FIG. 12 is a flow chart of the processes for recovery of the various metals.

The process is illustrated in the FIG. 12 flow chart showing the source materials receiving/processing step(s) 10, including mixed metals (e.g. Ta, Nb) alloys, metal scrap, used products such as electrolytic capacitors containing non-metal as well as metal components; condensation steps 12 and 14 as adjuncts to an iodization step and separation of iodides by fractional distillation/condensation (distillation) 15/16; hydrogen reduction of one or more of the separated iodides in a plasma furnace 18; powder metallurgy (PM) processing 20 such as pelletizing and for further processing production of a coherent product, such as a porous capacitor anode body and final product production (e.g. finished capacitor). The reaction's HI output can be dissociated as indicated at 18A and its hydrogen looped back to step 18 as a supplementary reducing agent source. The iodine can be looped back via condensation chambers as indicated at 12 and 14 and its iodine product can be looped back.

As mentioned above the processes of the present invention related source materials and end products can be achieved in many instances through other halide formation-hydrogen reduction processes using chlorine, bromine, or fluorine instead of iodine to form a metal halide followed by hydrogen reduction as described above for iodides to capture the metal. The reaction thermodynamics is favorable for several such reductions. The metals so obtained can be refractory metals or heavy metals as described above. The source material can be similar to those described above.

7. Product

The metals are preferably obtained as fine (nanoscale) powders of substantially spherical morphology, substantial uniformity of size within about one order of magnitude (e.g. 1 to 10 or 10-100×$10^{-9}$ m of diameter) and an average particle diameter within such range, being substantially non-agglomerated through their synthesis production, and consequently, with a surface area significantly above and a bulk density significantly below metal powders as produced by conventional methods such as tantalum production by sodium reduction of potassium heptafluotantalate ($K_2TaF_7$), or tantalum or niobium production by magnesium reduction of a tantalum or niobium pentoxide. These characteristics were measured for tantalum as produced by (a) heating tantalum pentachloride at 250-270° C. and feeding it into a hydrogen flow (or argon-hydrogen flow) of a plasma furnace hot zone at an average (calculated) temperature of 2200-5000 degrees Kelvin. The reduction reaction drop out of those powders so formed from the hot zone took place in about 1/100th of a second with metal chloride reduction as metal particle nucleation taking place in such period. A cooling rate of about $10^5$-$10^6$ degrees per second was realized. By varying chloride and hydrogen flow rate the tantalum particle size was typically 20-80 nanometers. Some examples of this process and resultant product were these:

Example 1: Tantalum pentachloride was fed into a hydrogen plasma jet at 5 g/min feed rate. Hydrogen feeding rate was 2 g/min (28 times hydrogen excess). The average temperature of the plasma jet was 2600K. Surface area of the produced tantalum powder was 18 $m^2$/g, average particle size was about 20 nm.

Example 2: Tantalum pentachloride was fed into hydrogen plasma jet at 12 g/min feeding rate. Hydrogen feeding rate was 3 g/min (17 times hydrogen excess). The average temperature of the plasma jet was 3000K. Surface area of the produced tantalum powder was 8 $m^2$/g, and average particle size was about 45 nm.

Example 3: Tantalum pentachloride was fed into an argon-hydrogen plasma jet at 10 g/min feeding rate. Argon feeding rate was 30 g/min, hydrogen feeding rate is 2 g/min (14 times hydrogen excess). The average temperature of the plasma jet was 4200K. Surface area of the produced tantalum powder was 12 $m^2$/g and average particle size was about 30 nm.

Example 4: Tantalum pentachloride was fed into argon-hydrogen plasma jet at 120 g/min feeding rate. Argon feeding rate was 375 g/min, hydrogen feeding rate was 17.85 g/min (10 times hydrogen excess). The average temperature of the plasma jet was 2300K. Surface area of the produced tantalum powder was 5 $m^2$/g and average particle size was about 72 nm.

The samples of the tantalum powder so produced were studied. The bulk density of the primary powder was in the 0.17-0.25 g/$cm^3$ range. Particle size distribution was logarithmic normal and its order of magnitude did not exceed 1. The particles had a morphology close to spherical. Due to the high cooling rate the powders contained a lot of defects. It can be characterized as the difference of the lattice parameter of the nanopowder from that of tantalum ingot. The powder had high adsorption propensity and was very chemically reactive. It should be stored and handled in an inert atmosphere. Pressing of the sintered powders was possible in the pressure range of 0.1-2.0 t/$cm^2$. Powder density after pressing varied in the range of 2.0 g/$cm^3$-5.0 g/$cm^3$, i.e. reaching about 30% of the theoretical density of tantalum (see Tables 4 & 5 below). Stabilization of crystalline structure and, therefore, the surface properties of the powders, and narrowing the particle size distribution as well as partial growth of the particle size were attained during later sintering of the nanopowders in vacuum. The sintering accomplished (in the early stages) an annealing to reduce the crystalline defects content of the powders as well as its primary purpose of bonding powders at constant points to form porous pellets with great internal surface area and high and uniform pore area and volume. For example, a primary powder with a starting surface area of 20 $m^2$/g (particle size of 20 nm) after sintering at 1100° C. for two hours exhibited the surface area of 2 $m^2$/g (particle size of 200 nm). Lowering sintering temperature will result in increase of the surface area.

TABLE 4

| Sample number | Pressure | Density, g/$cm^3$ | Density/theoretical density |
| --- | --- | --- | --- |
| 1 | 0.25 | 3.15 | 0.19 |
| 2 | 0.5 | 3.65 | 0.22 |
| 3 | 1.0 | 4.34 | 0.26 |
| 4 | 2.0 | 5.28 | 0.32 |
| 5 | 5.0 | 5.88 | 0.35 |

TABLE 5

| Sample number | Density, g/cm$^3$ | Density/theoretical density |
|---|---|---|
| 1 | 4.72 | 0.28 |
| 2 | 5.15 | 0.31 |
| 3 | 5.97 | 0.36 |
| 4 | 6.90 | 0.42 |
| 5 | 7.78 | 0.47 |

Total metallic impurity content (W+Cr+Ni+Fe+Cu) of the samples was less than 10 ppm. The sintering/bonding can be conducted under conditions well known in the art including sintering in vacuum or inert gas, hot isostatic pressing and other types to achieve densities of 50-98% of theoretical density while protecting freedom from excessive metallic or interstitial impurities depending on desired end properties and uses (e.g. porous electrolytic capacitor anodes vs. mill products and end use parts of high strength, durability and/or corrosion resistance.

Testing of the above produced powder samples was done by conventional gas (nitrogen) capillary filling adsorption—desorption instruments adapted to BJH (Barrett, Joyner and Handler) and BET (Brunauer, Emmet and Teller) methods. The tests had measured warm free space of 11.0649 cc, measured cold free space of 33.0934 cc, sample density of 1 g/cc, sample mass of 0.349 g. The test results showed BET surface area of 18 m$^2$/g; BJH adsorption (indicative of cumulative surface area of pores) equal to 0.8224 m$^2$/g and 0.8492 m$^2$/g for BJH desorption indicating BJH adsorption (4V/A) average pore width of 377 Angstroms and BJH desorption (4V/A) average pore width of 283 Angstroms.

Figure 13A:
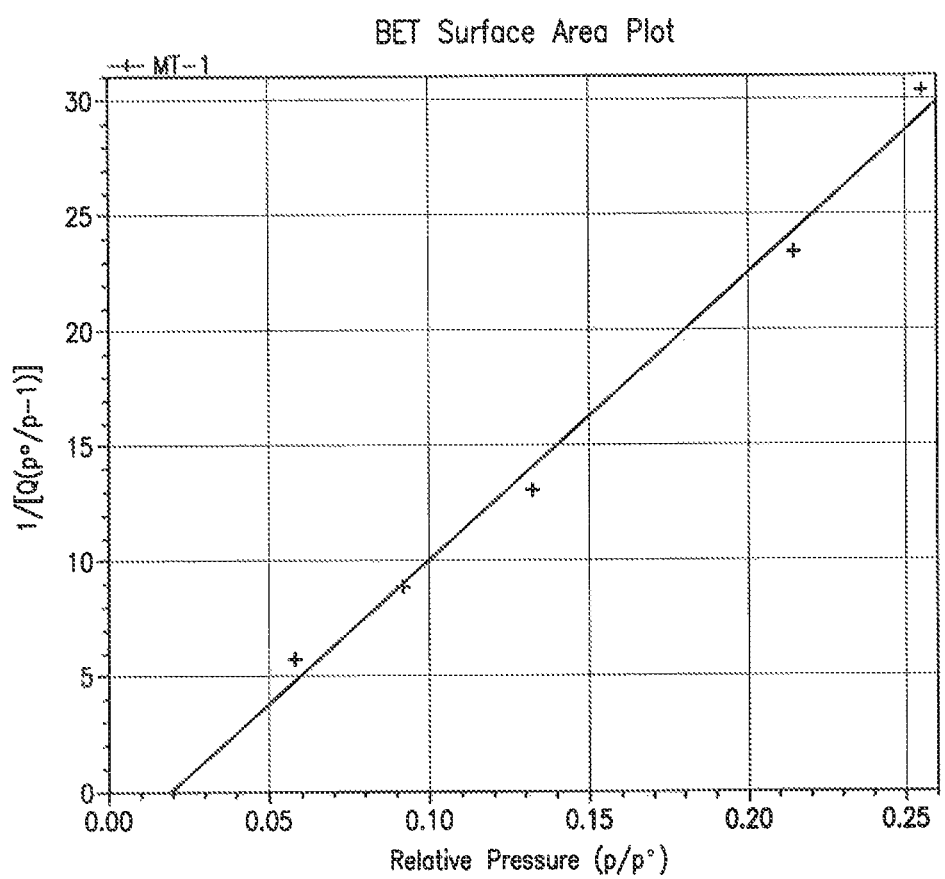
FIGS. 13A-13L are graphs of results of pore surface areas, partial surface area, pore volumes, bulk density and other characteristics of hydrogen (in plasma) reduced tantalum pentachloride powder as determined by BJH and BET methodologies.
Figure 13B:
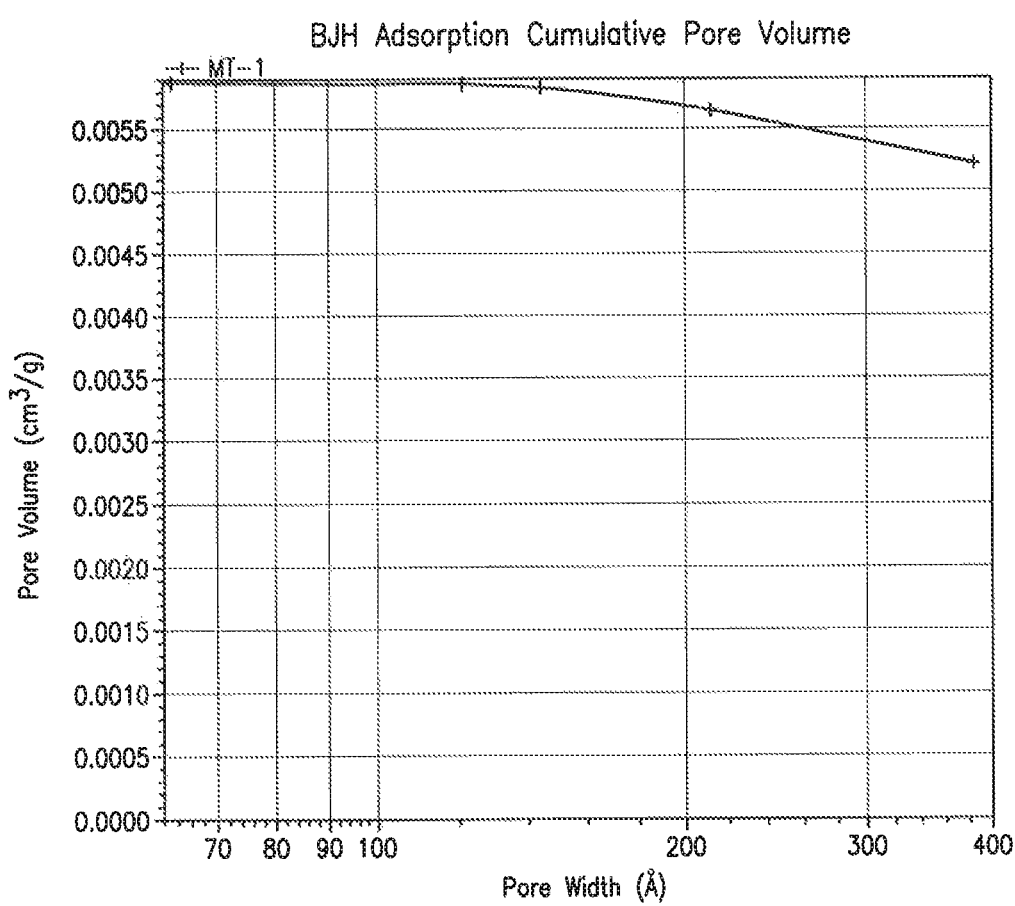
Figure 13C:
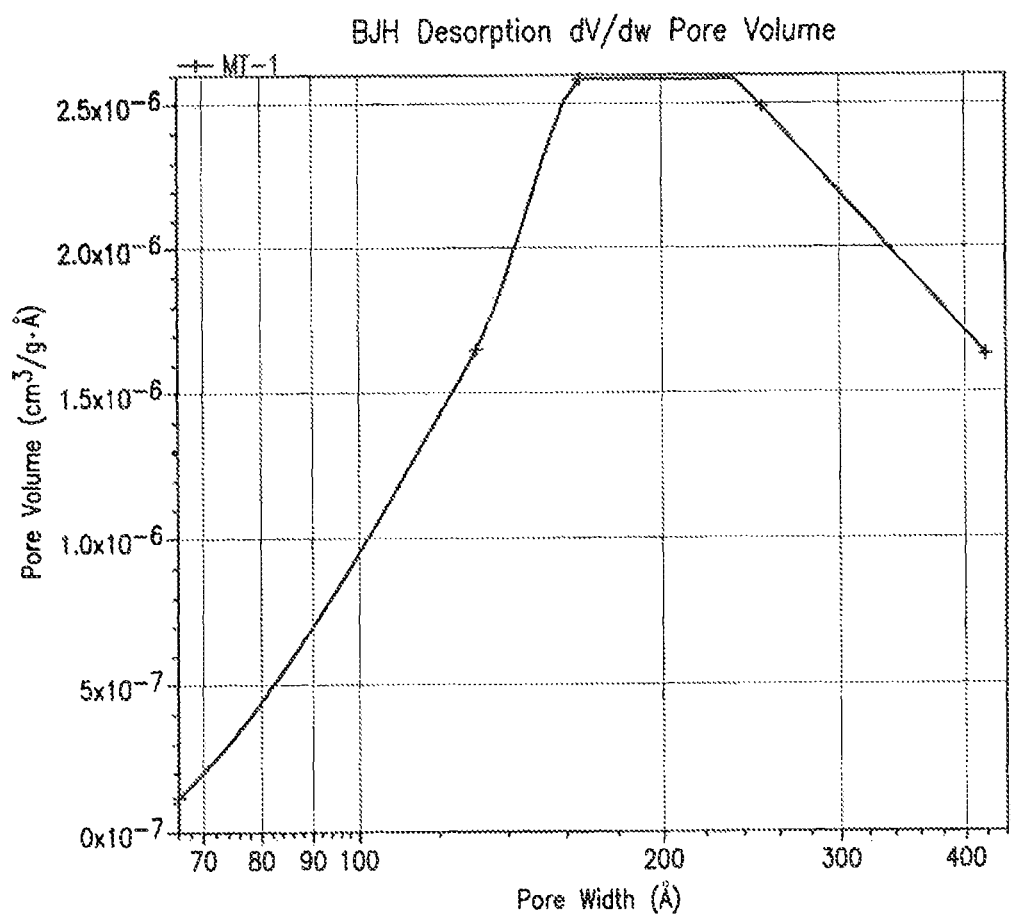
Figure 13D:
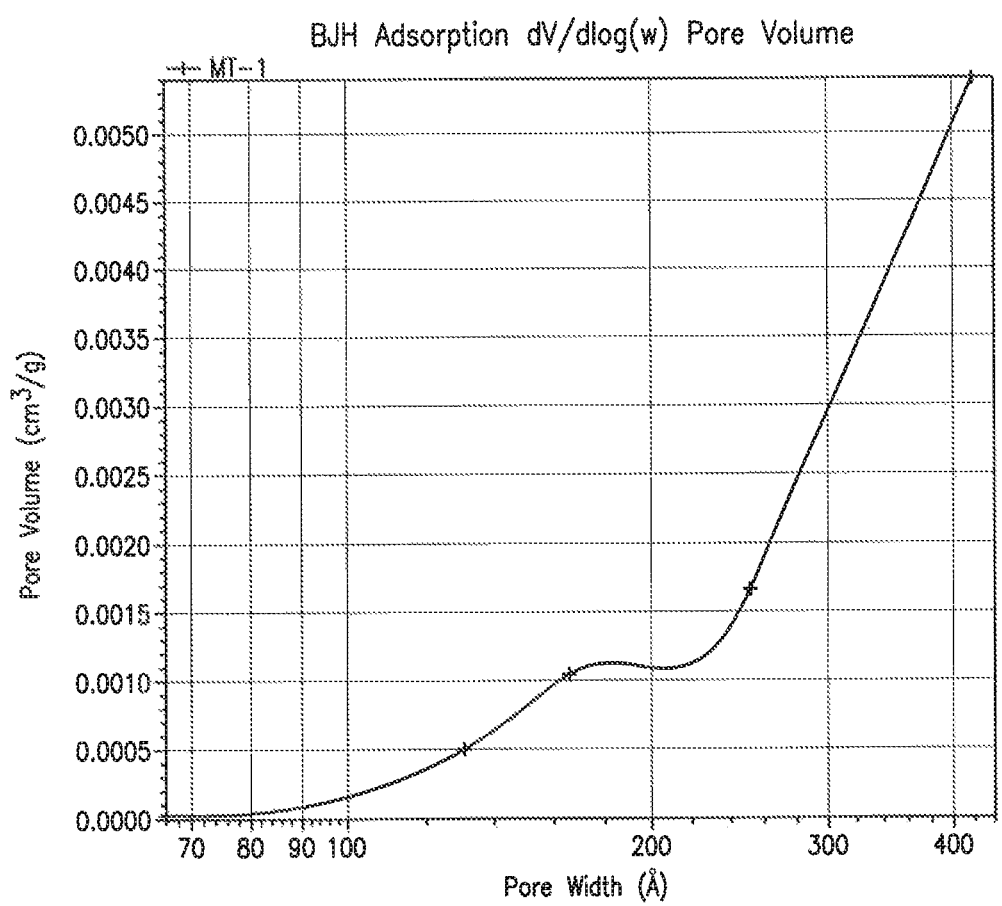
Figure 13E:
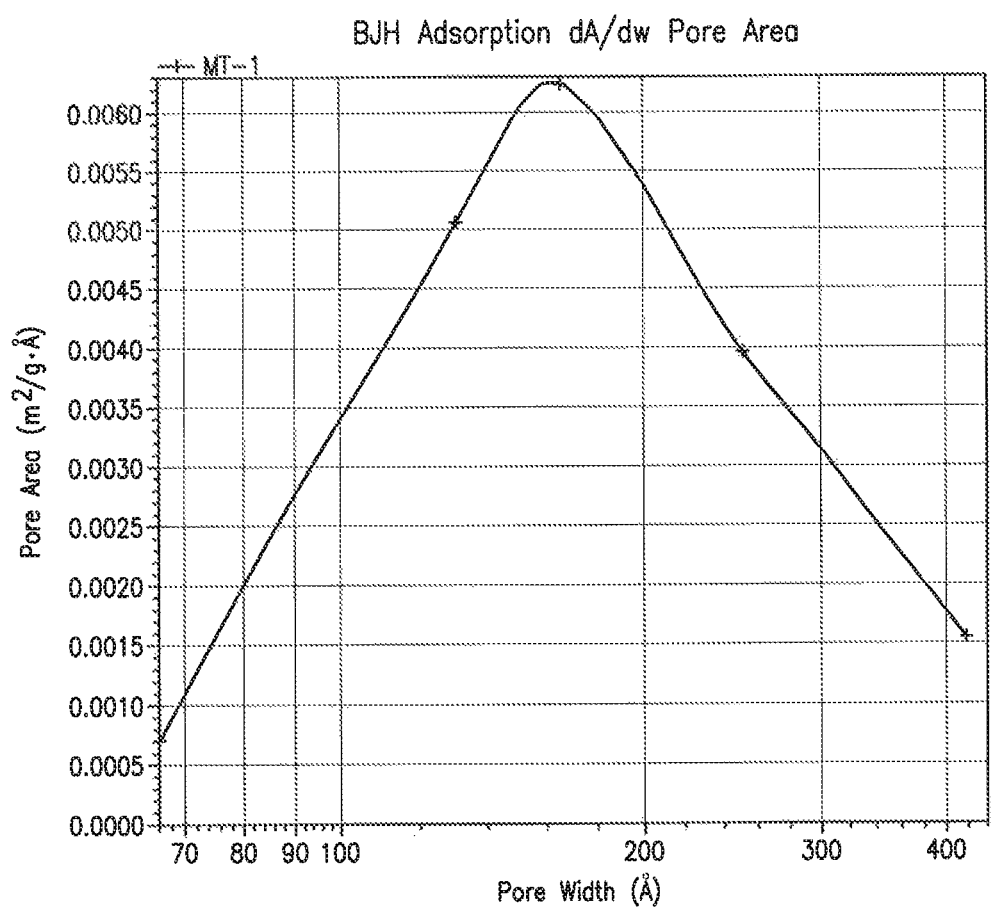
Figure 13F:
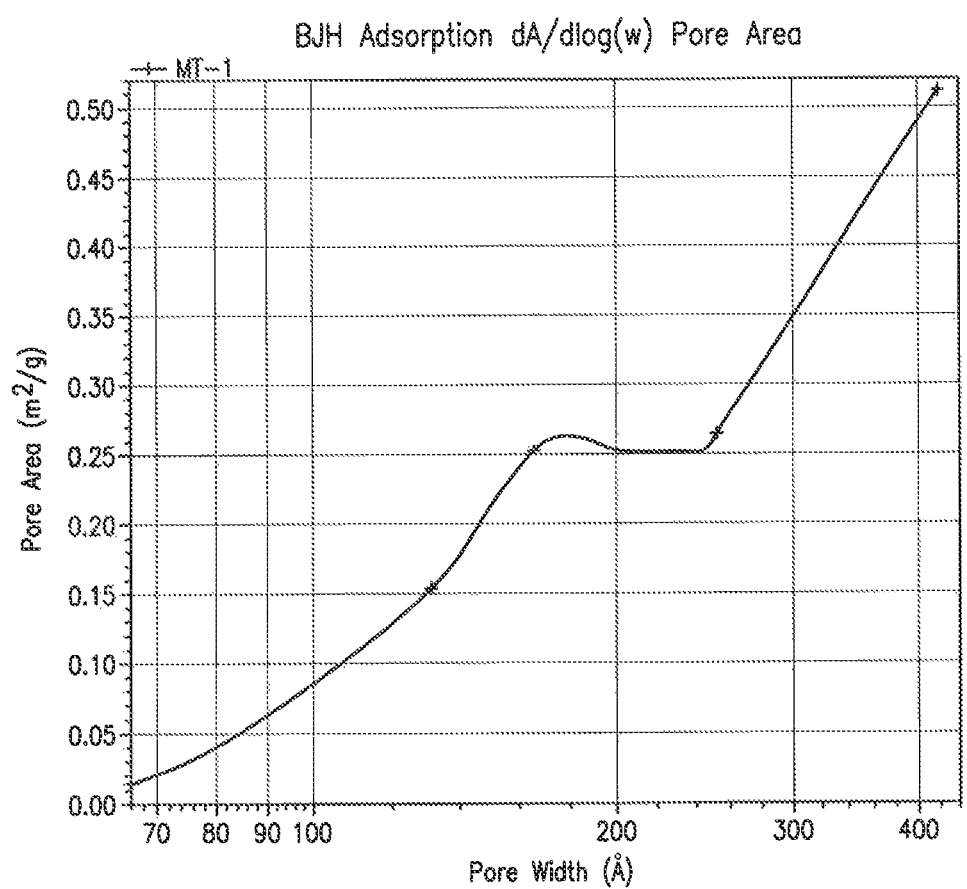
Figure 13G:
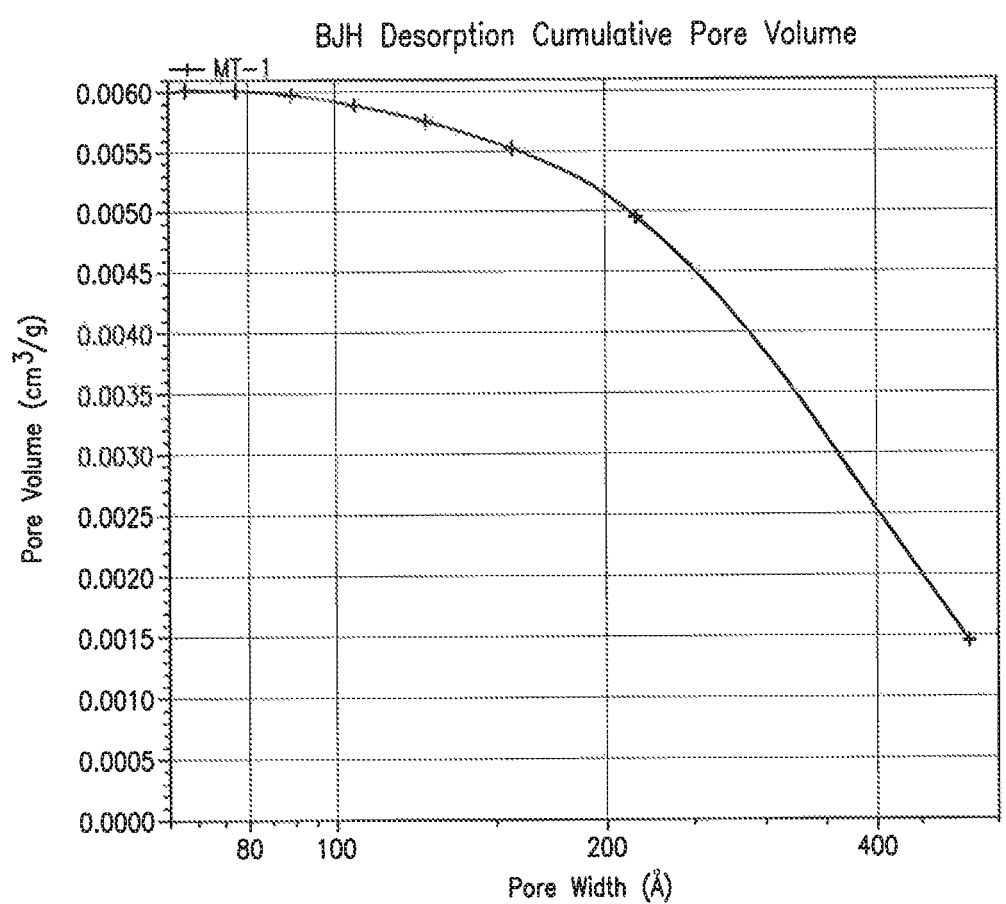
Figure 13H:
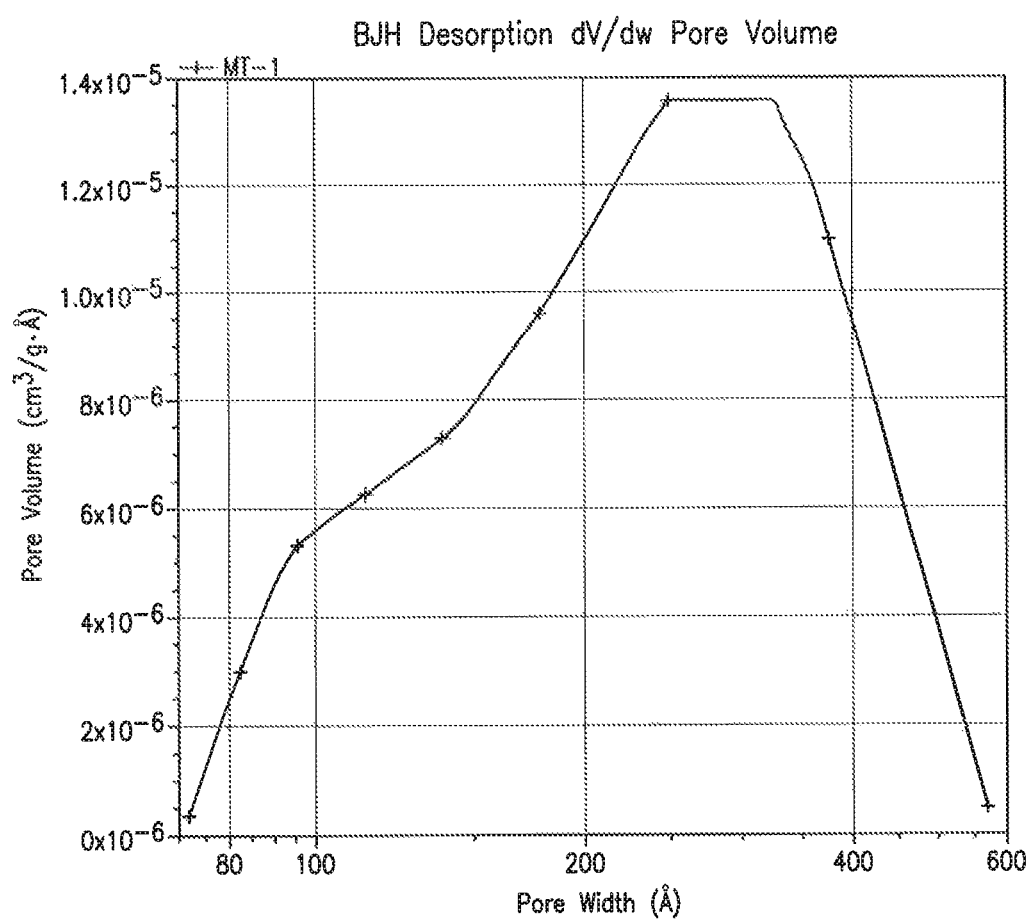
Figure 13I:
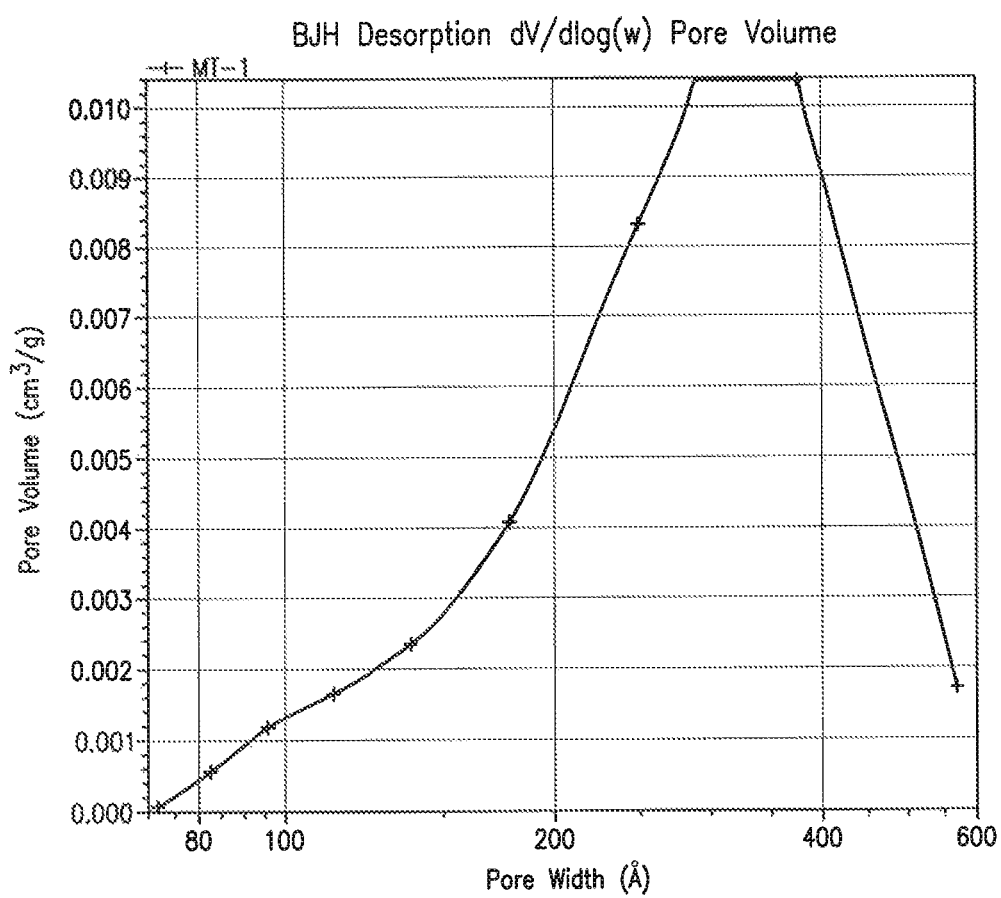
Figure 13J:
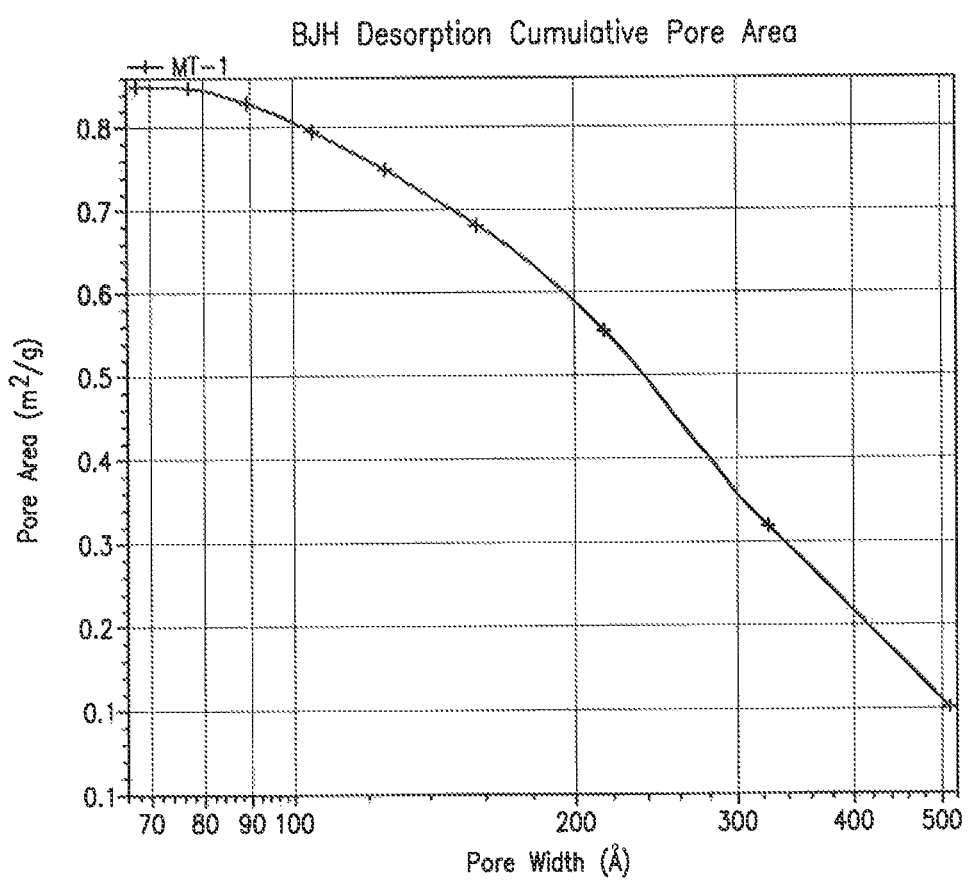
Figure 13K:
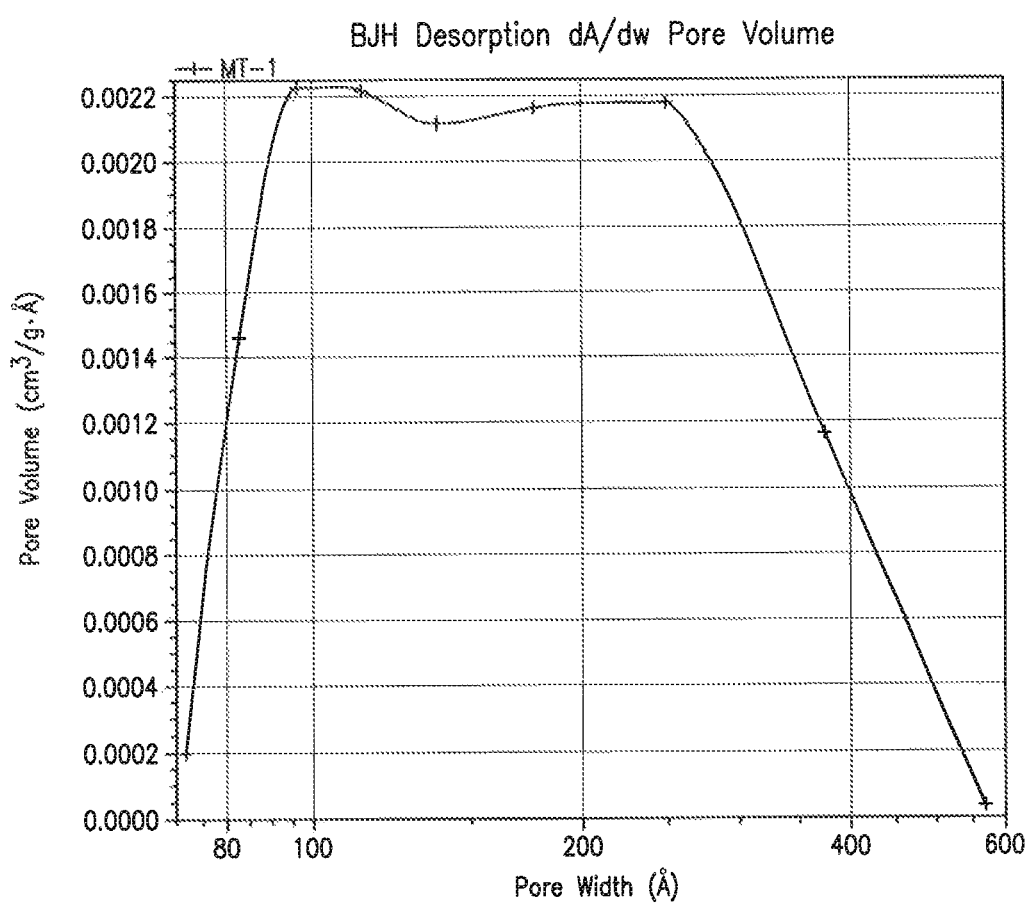
Figure 13L:
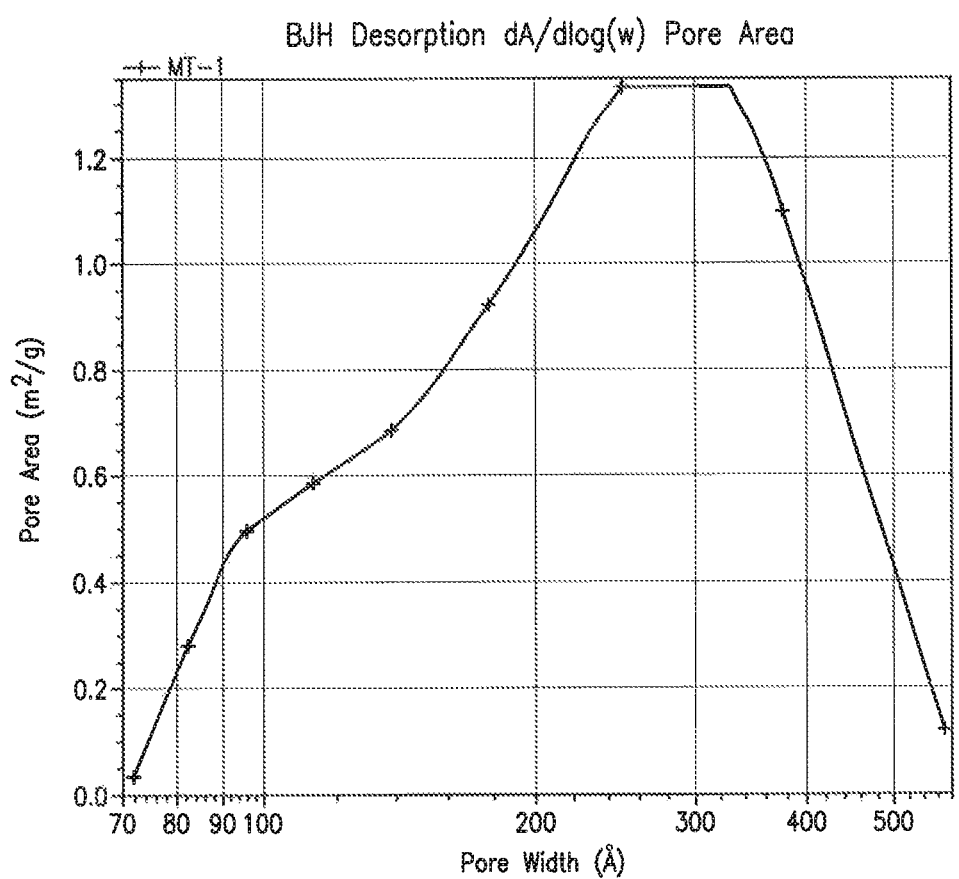

BET theory was applied to the data sets to derive surface area plots of 1/[Q p°/p-1)] vs. relative pressure (p/p°) as shown in FIG. 13A for such sample. Traces of measured or concluded physical characteristics of the powder samples are shown in FIG. 13B (BJH-Adsorption Cumulative Pore Volume cm$^3$/g vs. pore width in Angstroms-1 linear y axis log x axis); FIGS. 13C and 13D (BJH dV/dW pore volume-cm$^3$/gm-Angstroms v. pore width in Angstroms); FIGS. 13E-13F (BJH) pore area in Angstroms (m$^2$/g-A) vs. pore width as dA/dw and dt/d(log(w)). Further BJH instrument/method desorption results are shown in FIG. 13G (cumulative pore volume (cm$^2$/g) vs. pore width in Angstroms); 13H (dv/dW pore volume vs. pore width); 13I (dV/d/log(w) pore volume vs. pore volume); 13J-L (pore area vs. pore width); and 13M (pore area vs. pore width). These and other samples from 1-4 above were used to derive the surface area, pore volume and pore size.

It is seen from the curves of 13A-13L that a high uniformity of pore diameter and pore volume is obtained. The diameter range is within 1.0 on a log scale and the volume changes only slightly when pore diameter changes. This is far superior to what is obtained in prior processes for producing tantalum powders. Through the present invention, a pellet can be produced in which all pores are substantially accessible for impregnation.

The effects of iodine, bromine, chlorine or fluorine treatment to produce metal halides, separation and hydrogen reduction of selected metals produced by reduction is applicable to certain metals and halide that can meet conditions exemplified in the FIGS. 1-9 and 10A-10F and related text above. Given present application's disclosure one skilled in the art can select and optimize appropriate combinations of metals from diverse natural and synthetic mixed metal sources and halogens and processing conditions to meet specification needs of target metals and achieve processing benefits and end product improvements described above and other benefits and improvements.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Method of recovering target component metals from a source material comprising alloys or other natural or synthesized mixtures of metals in elemental form or as metal compounds, the target component metals of source material being selected as two or more from the group consisting of rhenium, tantalum, niobium, tungsten, molybdenum, nickel, cobalt and iron, but including at least one of rhenium, tantalum, molybdenum, tungsten, niobium as target metal and comprising the steps of: (a) heating the material with iodine to convert at least some of the component metals to metal iodides, (b) separating the iodides by fractional volatilization or condensation, (c) at a temperature above 1000° C., converting at least one metal iodide so produced, to a metal product and iodine, and (d) looping recovered iodine back to step (a).

2. The method of claim 1 wherein the converting step (c) comprises a hydrogen reduction of the iodide and the recovered hydrogen is looped back to step (c).

3. The method of claim 1 wherein the conversion of at least one of the metal iodides is conducted by hydrogen reduction in a plasma heating process or externally heated vertical furnace to cause rapid reduction of the metal iodide, nucleation of the metal in gas phase and then, upon solidification of the metal at about the melting point of the metal, rapidly ended so that the metal is produced at nanoscale as essentially spherical form powder particles.

4. The method of claim 1 wherein the conversion of at least one of the metal iodides is conducted by hydrogen reduction or thermal decomposition in a furnace process producing powder particles of higher than nanoscale size.

5. The method of any of claim 1, 2, 3 or 4 wherein the source material comprises a recovered superalloy.

6. The method of any of claim 1, 2, 3 or 4 as applied to mixed oxides of said rhenium, tantalum, niobium, tungsten, molybdenum, nickel, cobalt and iron metals.

7. The method of claim 6 wherein the source material is a mixture of tantalum oxide and niobium oxide and a tantalum powder is obtained through the process with the addition of carbon in step (a), along with the oxides and iodine to produce tantalum iodide, niobium iodide and carbon monoxide, and wherein the tantalum iodide is separated from the niobium iodide and reduced by hydrogen to produce tantalum powder.

8. The method of claim 1 wherein the source material is a mixture including an oxide of at least one target metal including at least one oxide selected from oxides of target metals from the group consisting of Ta, Nb, Re, W, Mo, Zr, Hf, Cu, Ni, Fe, Co and at least one metal oxide, metal carbide or elemental metal selected from the same metal group, and at least one of said metals is obtained through the said steps (a) through (c).

9. The method of claim 8 as applied to source materials mixtures including tungsten oxide and obtaining pure tungsten (W).

10. The method of claim 8 as applied to source materials mixtures including molybdenum oxide to obtain pure molybdenum (Mo).

11. Method of processing a mixture of source materials with two or more mixed metallic components including at least one target metal component to be extracted from the said source mixture comprising the steps of: (a) converting two or more of the component metals to metal iodides by heating in the presence of iodine, (b) separating the metal iodides by fractional volatilization or condensation, (c) at a temperature above 1000° C., converting at least one target metal iodide to the target metal and (d) looping iodine back to step (a).

12. The method of claim 11 as applied to said source mixture of tantalum and niobium wherein the converting step (c) is a hydrogen reduction step and is applied to tantalum iodide to provide a nanoscale target tantalum metal powder product and hydrogen iodide, the hydrogen reduction process being conducted in a plasma heating process or externally heated vertical furnace.

13. The method of claim 11 wherein said mixture of source materials comprises tungsten oxide and molybdenum oxide to recover tungsten or molybdenum from said source mixture wherein the converting step (c) is a thermal decomposition process.

14. The method of claim 11 wherein the converting step (c) is a hydrogen reduction step that creates hydrogen iodide as well as a metal, dissociating the hydrogen iodide and further comprising circulating hydrogen back to step (c).

\* \* \* \* \*